(12) United States Patent
Sato

(10) Patent No.: US 9,531,315 B2
(45) Date of Patent: Dec. 27, 2016

(54) ELECTRIC VEHICLE AND CONTROL METHOD THEREFOR

(71) Applicant: Toyota Jidosha Kabushiki Kaisha, Toyota-shi, Aichi-ken (JP)

(72) Inventor: Ryoji Sato, Toyohashi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/626,138

(22) Filed: Feb. 19, 2015

(65) Prior Publication Data
US 2015/0244301 A1 Aug. 27, 2015

(30) Foreign Application Priority Data
Feb. 21, 2014 (JP) ................................. 2014-032286

(51) Int. Cl.
*H02P 7/32* (2006.01)
*H02P 27/06* (2006.01)
(Continued)

(52) U.S. Cl.
CPC .............. *H02P 27/06* (2013.01); *B60L 3/003* (2013.01); *B60L 7/14* (2013.01); *B60L 11/123* (2013.01); *B60L 11/14* (2013.01); *B60L 11/1861* (2013.01); *B60L 15/007* (2013.01); *B60L 15/2009* (2013.01); *B60L 15/2054* (2013.01); *B60L 2210/14* (2013.01); *B60L 2210/40* (2013.01); *B60L 2240/12* (2013.01);
(Continued)

(58) Field of Classification Search
CPC ........... H02P 27/04; H02P 27/06; H02P 27/05; H02P 27/047; H02P 2201/07; H02P 2201/09
USPC .................................................. 318/147, 807
See application file for complete search history.

(56) References Cited

U.S. PATENT DOCUMENTS

| | | | | |
|---|---|---|---|---|
| 4,475,631 A | * | 10/1984 | Nomura | ..................... H02P 3/18 187/296 |
| 2009/0021200 A1 | * | 1/2009 | Yaguchi | ................. B60K 6/445 318/400.09 |

(Continued)

FOREIGN PATENT DOCUMENTS

| | | |
|---|---|---|
| CN | 101421141 A | 4/2009 |
| JP | 2011-015603 A | 1/2011 |
| JP | 2013-013198 A | 1/2013 |

*Primary Examiner* — Eduardo Colon Santana
*Assistant Examiner* — Bickey Dhakal
(74) *Attorney, Agent, or Firm* — Dinsmore & Shohl LLP

(57) ABSTRACT

A hybrid vehicle includes a battery, a boosting converter, first and second inverters, a first inverter connected to the first inverter, a second motor generator connected to the second inverter, and a control unit configured to start and suspend the boosting converter. The control unit increases one or both of carrier frequencies $F_{c1}$, $F_{c2}$ of the first and second inverters as a real boost voltage VHr increases during a suspended state of the boosting converter. The control unit decreases one or both of the carrier frequencies of the first and second inverters as real boost voltage VHr decreases during a suspended state of the boosting converter. System efficiency of an electric vehicle can be improved effectively by increasing the suspension time of the boosting converter, while securing drivability of the vehicle.

5 Claims, 14 Drawing Sheets

(51) Int. Cl.
*B60L 3/00* (2006.01)
*B60L 7/14* (2006.01)
*B60L 11/12* (2006.01)
*B60L 11/14* (2006.01)
*B60L 11/18* (2006.01)
*B60L 15/00* (2006.01)
*B60L 15/20* (2006.01)
*H02P 5/74* (2006.01)

(52) U.S. Cl.
CPC ... *B60L 2240/421* (2013.01); *B60L 2240/423* (2013.01); *B60L 2240/429* (2013.01); *B60L 2240/441* (2013.01); *B60L 2240/443* (2013.01); *B60L 2240/547* (2013.01); *B60L 2240/549* (2013.01); *B60L 2240/80* (2013.01); *B60L 2250/26* (2013.01); *H02P 5/74* (2013.01); *Y02T 10/6217* (2013.01); *Y02T 10/644* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/7225* (2013.01); *Y02T 10/7241* (2013.01); *Y02T 10/7275* (2013.01)

(56) References Cited

U.S. PATENT DOCUMENTS

2013/0249469 A1* 9/2013 Pahlevaninezhad .... H02J 7/022
 320/107
2014/0232304 A1 8/2014 Sekiya et al.

* cited by examiner

ELECTRIC VEHICLE AND CONTROL METHOD THEREFOR

PRIORITY INFORMATION

The entire disclosure of Japanese Patent Application No. 2014-032286, filed on Feb. 21, 2014, including the specification, claims, drawings, and abstract, is incorporated herein by reference in its entirety.

TECHNICAL FIELD

The present invention relates to a structure of an electric vehicle mounted with an electric motor and a generator, and to a control method of such an electric vehicle.

BACKGROUND ART

Recently, a hybrid vehicle mounted with an engine, an electric motor, and a generator, has been used on various occasions, as has an electric vehicle mounted with an electric motor and a generator. The hybrid vehicle is driven according to its travelling state. For example, the hybrid vehicle may be driven by a combination of output of the engine and the electric motor, or by using part of the output of the engine to operate the generator and charge a battery, while combining the remaining output of the engine and the output of the electric motor to drive the vehicle. Alternatively, the output of the engine may be used to drive the generator, and the generated power is used to operate the electric motor to drive the vehicle. In many cases, such hybrid vehicles or electric vehicles use a boosting converter to boost a direct current (DC) low voltage of a battery to a DC high voltage that is supplied to inverters where the power is received and supplied between the electric motor and the generator. The inverters operate the electric motor by converting the DC power into a three-phase alternating (AC) power for operating the electric motor, or convert the three-phase AC power generated by the generator into DC power.

The boosting converter is configured to boost a DC low voltage of a battery to output a DC high voltage by turning on and off switching elements and using energy stored in a reactor, in which a boosting loss is generated by turning on and off the switching elements. The boosting loss increases as output power and a boosting ratio (ratio of the DC high voltage to the DC low voltage) of the boosting converter increase, and vice versa. However, even in a no-load state where the output power of the boosting converter is zero, the boosting loss (switching loss) does not come to zero so long as the switching element is carrying out the on-off operation.

In the hybrid vehicle or the electric vehicle, when the vehicle drives in a travelling state where the power generated by the generator is balanced with the power consumed by the electric motor, the vehicle can continue traveling while maintaining the DC high voltage of the inverters. This is because the electric motor can be operated in this state by using only the power generated by the generator without using the DC high voltage obtained by boosting the DC low voltage of the battery. Since the boosting converter has no load in this case, it may be possible to suspend the operation of the boosting converter to decrease the boosting loss (switching loss) in order to improve efficiency of the vehicle system. However, it is difficult to maintain a perfect balance of the power consumed by the electric motor and the power generated by the generator. For example, if the power consumed by the electric motor is somewhat larger than the power generated by the generator, the DC high voltage of the inverters may gradually decrease upon suspension of the boosting converter. In view of this, there has been proposed a method in which, when the power generated by the electric motor is balanced with the power consumed by the generator, the operation of the boosting converter is suspended and the output torque of the electric motor is corrected in order to decrease the deviation between the DC high voltage of the inverters and a target voltage, with an output power of the generator being fixed. Accordingly, the power generated by the generator is balanced with the power consumed by the electric motor, and the DC high voltage of the inverters can be maintained.

CITATION LIST

Patent Literature

Patent Document 1: JP 2011-15603 A

In a conventional technique disclosed in Patent Document 1, however, the output torque of the electric motor is corrected by the suspension of the operation of the boosting converter, which may change the torque to drive the vehicle and decrease drivability thereof.

SUMMARY OF THE INVENTION

An object of the present invention is to improve efficiency of a system of an electric vehicle by increasing suspension time of a boosting converter, while securing drivability.

An electric vehicle of the present invention includes a battery, a boosting converter connected to the battery, a first inverter connected to the boosting converter, a second inverter connected to the boosting converter and the first inverter, a first motor generator connected to the first inverter, a second motor generator connected to the second inverter, and a control unit configured to suspend activation of the boosting converter. When the boosting converter is suspended, the control unit increases a carrier frequency of one or both of the first and second inverters as a real boost voltage increases. The control unit decreases the carrier frequency of one or both of the first and second converters as the real boost voltage decreases.

In the electric vehicle of the present invention, it may also be preferable to increase or decrease the carrier frequency of one of the first and second inverters having a larger increasable amount or decreasable amount of inverter loss due to the increase or decrease of the carrier frequency.

Further, in the electric vehicle of the present invention, it may also be preferable to decrease the carrier frequency of the inverter connected to one motor generator having a higher number of revolutions of the first and second motor generators when a difference between the increasable amount or decreasable amount of the inverter loss of the first and second inverters, due to the increase or decrease of the carrier frequency of the first and second inverter, is smaller than a predetermined threshold value.

While the carrier frequency of the electric vehicle of the present invention is being increased, it may even be preferable not to increase the carrier frequency when the increase amount of the inverter loss due to the increase of the carrier frequency exceeds the decrease amount of the boosting loss due to the suspension of the boosting converter. According to the present invention, a control method of an electric vehicle is provided. The electric vehicle includes a battery, a boosting converter connected to the battery, a first inverter connected to the boosting converter, a second inverter connected to the boosting converter and the first inverter, a first motor generator connected to the first inverter, a second motor generator connected to the second inverter, and a control unit configured to suspend activation of the boosting converter. The control method includes increasing a carrier frequency of one or both of the first and second inverters when a real boost voltage is increased, and decreasing the carrier frequency of one or both of the first and second inverters when the real boost voltage is decreased during the suspension of the boosting converter.

The present invention provides an effect to improve efficiency of a system of an electric vehicle by increasing suspension time of a boosting converter, while securing drivability.

BRIEF DESCRIPTION OF THE DRAWINGS

Preferred embodiments of the present invention will be described in detail by reference to the following figures, wherein.

DETAILED DESCRIPTION OF THE EMBODIMENT

Figure 1:
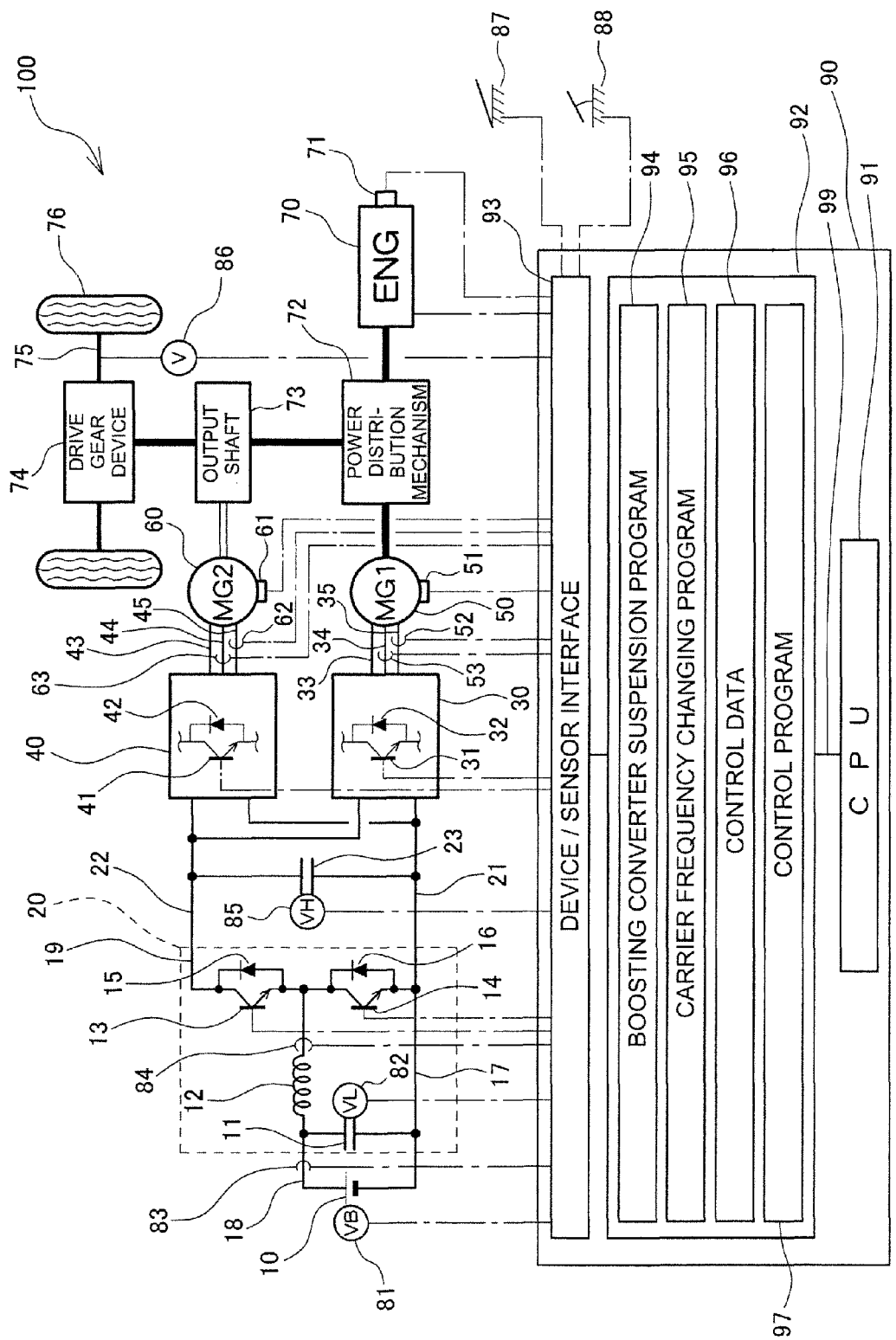
FIG. 1 is a system diagram illustrating a structure of a hybrid vehicle according to an embodiment of the present invention.

An embodiment of the present invention will be described below by reference to the accompanying drawings. In the description below, the present invention is applied to a hybrid vehicle that includes an engine and two motor generators. In addition to the hybrid vehicle, the present invention is applicable to an electric vehicle without the engine mounted therein. As illustrated in FIG. 1, a hybrid vehicle 100 of the present embodiment includes a battery 10 that is a secondary battery capable of charging and discharging, a boosting converter 20 connected to the battery 10, a first inverter 30 connected to the boosting converter 20, a second inverter 40 connected to the boosting converter 20 and the first inverter 30, a first motor generator 50 configured as a generator and connected to the first inverter 30, a second motor generator 60 configured as an electric motor and connected to the second inverter 40, an engine 70 capable of driving the first motor generator 50, and a control unit 90 configured to control the engine 70, the boosting converter 20, and the first and second inverters 30, 40.

As illustrated in FIG. 1, the hybrid vehicle 100 also includes a power distribution mechanism 72 configured to distribute output torque of the engine 70 into torque to be provided to an output shaft 73 connected to the second motor generator 60 and torque to be provided to operate the first motor generator 50, a drive gear device 74 connected to the output shaft 73, an axle 75 connected to the drive gear device 74, and wheels 76 installed to the axle 75. Resolvers 51, 61, 71 configured to detect the rotation angle or the number of revolutions of a rotor or a crankshaft are attached to the first and second motor generators 50, 60 and the engine 70. A vehicle speed sensor 86 configured to detect vehicle speed of the hybrid vehicle by detecting the number of revolution of the axle is attached to the axle 75.

The boosting converter 20 includes a negative side electric path 17 connected to the negative side of a battery 10, a low voltage electric path 18 connected to the positive side of the battery 10, and a high voltage electric path 19 at the output terminal of the positive side of the boosting converter 20. The boosting converter 20 includes an upper arm switching element 13 arranged between the low voltage electric path 18 and the high voltage electric path 19, a lower arm switching element 14 arranged between the negative side electric path 17 and the low voltage electric path 18, a reactor 12 arranged in series with the low voltage electric path 18, a reactor current sensor 84 that detects reactor current IL flowing through the reactor 12, a filter capacitor 11 arranged between the low voltage electric path 18 and the negative side electric path 17, and a low voltage sensor 82 that detects the DC low voltage VL across the filter capacitor 11. Diodes 15, 16 are connected reversely parallel to the switching elements 13, 14. The boosting converter 20 turns on the lower arm switching element 14 and turns off the upper arm switching element 13 to store the electric energy from the battery 10 in the reactor 12. Subsequently, the boosting converter 20 turns off the lower switching element 14 and turns on the upper arm switching element 13 to increase the voltage by means of the electric energy stored in the reactor 12, in order to supply the DC high voltage VH, which is a boosted voltage, to the high voltage electric path 19.

The battery 10 includes a battery voltage sensor 81 that detects a battery voltage VB. In the low voltage electric path 18 between the battery 10 and the boosting converter 20, a battery current sensor 83 that detects battery current IB flowing therebetween is provided.

The first and second inverters 30 and 40 include a common high voltage electric path 22 connected to the high voltage electric path 19 of the boosting converter 20, and a common negative side electric path 21 connected to the negative side electric path 17 of the boosting converter 20. A smoothing capacitor 23 that operates to smooth the DC current supplied from the boosting converter 20 is connected between the high voltage electric path 22 and the negative side electric path 21. The DC high voltage VH, which is a boosted voltage supplied to the inverters 30, 40, is detected by a high voltage sensor 85 that detects the voltage across the smoothing capacitor 23. The DC high voltage detected by the high voltage sensor 85 is, therefore, a real boost voltage (real boosted voltage VHr). In the present embodiment, the same real boost voltage VHr is supplied to the first and second inverters 30, 40. The first inverter 30 converts the DC power received from the boosting converter 20 into a first three-phase AC power and supplies it to the first motor generator 50. At the same time, the first three-phase AC power generated by the first motor generator 50 is converted into the DC power to charge the battery 10 via the boosting converter 20. Alternatively, the converted DC power may be supplied to the second inverter 40. The second inverter 40 converts the DC power received from the boosting converter 20 into a second three-phase AC power and supplies it to the second motor generator 60. At the same time, the second three-phase AC power generated by the second motor generator 60 is converted into the DC power to charge the battery 10 via the boosting converter 20. Alternatively, the converted DC power may be supplied to the first inverter 30.

The first inverter 30 includes a total of six switching elements 31 of the upper and lower arms for U, V, and W phases, respectively. Each switching element 31 is provided with a diode 32 connected thereto in a reversely parallel manner (in FIG. 1, one switching element and one diode alone are illustrated among the six switching elements and diodes, and the other switching elements and diodes are not illustrated).

For the U, V, and W phases of the first inverter 30, output lines 33, 34, and 35 for outputting current of the U, V, and W phases, respectively, are connected between the switching elements of the upper and lower arms. The output lines 33, 34, and 35 are connected to input terminals of the U, V, and W phases, respectively. In the present embodiment, current sensors 53, 52 that detect current are provided on the output lines 34, 35 of the V and W phases, respectively. No current sensor is attached to the output line 33 of the U phase, because the current value of the U phase can be calculated from the current values of the V and W phases from the sum of the current of the U, V, and W phases being zero in the three phase alternating current.

The second inverter 40 (switching elements 41, diodes 42, and output lines 43, 44, and 45) and current sensors 62, 63 are configured similarly to the first inverter 30 and the current sensors 52, 53 described above. The hybrid vehicle 100 is also provided with an accelerator pedal depression amount detecting sensor 87 and a brake pedal depression amount detecting sensor 88 to detect a depression amount of the acceleration pedal and the brake pedal, respectively.

As illustrated in FIG. 1, the control unit 90 includes a CPU 91 that performs calculation processing, a storage unit 92, and a device/sensor interface 93. The control unit 90 is configured as a computer in which the CPU 91 that performs the calculation processing, the storage unit 92, and the device/sensor interface 93 are connected via a data bus 99. The storage unit 92 stores control data 96 of the hybrid vehicle 100, a control program 97, and a boosting converter suspension program 94 provided as suspension means of the boosting converter and a carrier frequency changing program 95 provided as changing means of the carrier frequency, both of which will be described later. The switching elements 13, 14 of the boosting converter 20 and the switching elements 31, 41 of the first and second inverters 30, 40 having been described above are connected to the control unit 90 via the device/sensor interface 93 and configured to operate according to an instruction from the control unit 90. The control unit 90 is also configured to receive the outputs of the battery voltage sensor 81, the low voltage sensor 82, the high voltage sensor 85, the battery current sensor 83, the reactor current sensor 84, the current sensors 52, 53, 62, 63, the resolvers 51, 61, 71, the vehicle speed sensor 86, the accelerator pedal depression amount detecting sensor 87, and the brake pedal depression amount detecting sensor 88.

Figure 2:
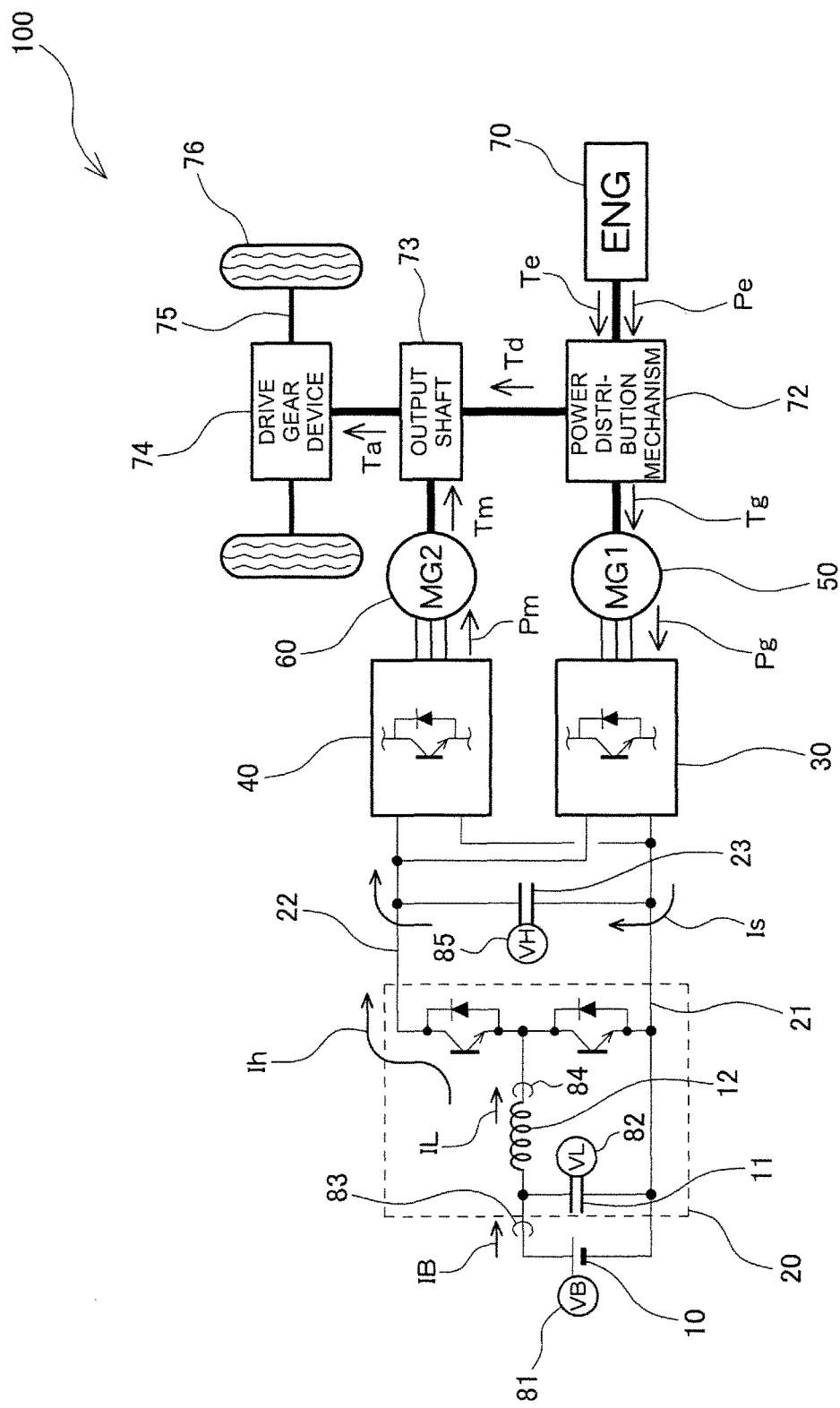
FIG. 2 is an explanatory view illustrating flows of power, electric power, and electric current of the hybrid vehicle according to the embodiment of the present invention.

Before proceeding to the description of the operation of the boosting converter of the hybrid vehicle 100 configured as described above, a basic operation of the hybrid vehicle 100 will be briefly described by reference to FIG. 2. Although the hybrid vehicle 100 would be operated in various driving modes, a driving mode described below is to drive the hybrid vehicle 100 by the engine 70 and the output of the second motor generator 60.

The engine 70 provides engine output Pe and engine torque Te. The engine torque Te is distributed to first torque Tg to operate the first motor generator 50 and engine direct torque Td to operate the wheels 76 via the output shaft 73 and the drive gear device 74. The power distribution mechanism 72 may use a planet gear device, for example. The first motor generator 50 functions as a generator that is driven by the first torque Tg from the power distribution mechanism 72 to output the generated three-phase AC power Pg to the first inverter 30. The first inverter 30 converts the input AC power Pg into the DC power of the DC high voltage VH and outputs the converted DC power to the high voltage electric path 22 and the negative side electric path 21. The output DC current Is is input to the second inverter 40 via the smoothing capacitor 23.

Meanwhile, the battery current IB of the battery voltage VB supplied from the battery 10 charges the filter capacitor 11 of the boosting converter 20 to supply the DC low voltage VL across the filter capacitor 11. Therefore, the battery voltage VB becomes equal to the DC low voltage VL when the filter capacitor 11 is charged and the battery 10 is connected to the boosting converter 20. As mentioned above, the boosting converter 20 first stores the electric energy from the battery 10 in the reactor 12 by turning on the lower arm switching element 14 and turning off the upper arm switching element 13, followed by turning off the lower arm switching element 14 and turning on the upper arm switching element 13. As a result, the voltage is boosted by means of the electric energy stored in the reactor 12 to output the boosted voltage of the DC high voltage VH to the high voltage electric path 19. In this case, the battery 10 supplies the boosting converter 20 with the power represented by (battery voltage VB×battery current IB) or (DC low voltage VL×reactor current IL). The boosting converter 20 receives the supplied power and outputs it as the power represented by (DC high voltage VH×average current Ih). The control unit 90 controls on-off duty of the switching elements 13, 14 to adjust the DC high voltage VH to a target boost voltage $VH_1$.

DC current Ih of the DC high voltage VH output from the boosting converter 20 is joined by DC current Is of the DC high voltage VH, and supplied to the second inverter 40. The second inverter 40 converts the input DC current (Is+Ih) of the DC high voltage VH into three-phase AC supply power Pm and supplies it to the second motor generator 60 functioning as a motor. The second motor generator 60 is driven by the supply power Pm to output motor torque Tm to the output shaft 73. The output shaft 73 receives the engine direct torque Td, as mentioned above, and the motor torque Tm to transmit a sum of both torques Ta to the drive gear device 74. Accordingly, the wheels 76 are driven by the torque sum Ta of the torque Td and Tm that have been output from the engine 70 and the second motor generator 60, respectively. As used herein, the power that goes to the motor generators 50, 60 is regarded as positive power, and the power that goes to the inverters 30, 40 is regarded as negative power. That is, the generated power Pg of the first motor generator 50 is negative, and the supplied power Pm to the second motor generator 60 is positive.

When just a small amount of driving force is required for the hybrid vehicle 100, the DC power of the high voltage VH and the DC current Is, which have been output from the first inverter 30, is stepped down by the boosting converter 20 and charged in the battery 10. For braking the hybrid vehicle 100, the second motor generator 60 also functions as the generator and the generated AC power (negative) is converted to the DC power in the second inverter 40 and charged in the battery 10.

Next, by reference to FIGS. 3 to 5, the hybrid vehicle 100 of the present invention will be described regarding operations including the operation to suspend the boosting converter 20, the operation to adjust carrier frequencies when the boosting converter 20 is suspended, in which an absolute value of the supplied power Pm (positive) is larger than an absolute value of the supplied power Pg (negative) generated by the first motor generator 50, and the operation to restart the boosting converter 20.

Figure 4A:
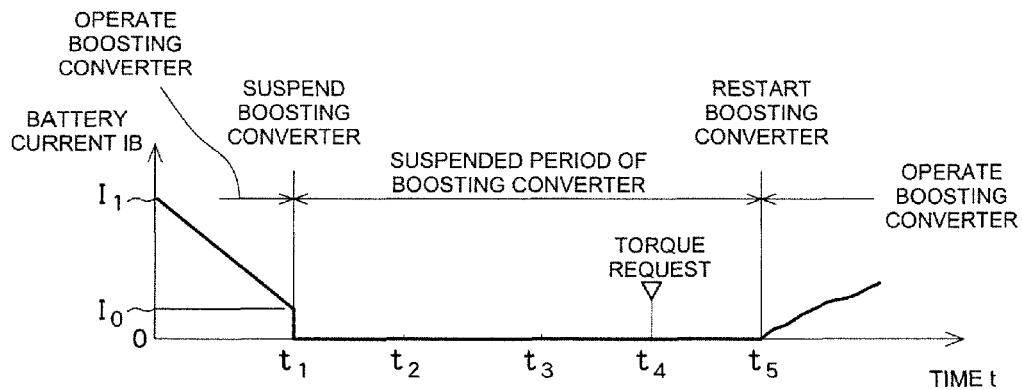
FIG. 4A is a graph illustrating a battery current over time during the operation illustrated in FIG. 3.

At time zero (initial state) in FIG. 4A, the boosting converter 20 is in operation. As indicated by line r of FIG. 4B, a real boost voltage VHr, which is the DC high voltage VH detected by the high voltage sensor 85, is a target boost voltage $VH_1$. The engine 70 is in operation and drives the first motor generator 50 as a generator, with the generated power Pg being $Pg_0$ (negative). As described above by reference to FIG. 2, the generated power $Pg_0$ is converted into the DC power $(VH_1 \times Is) = Pg_0 \times \eta_1$ from the target boost voltage $VH_1$ and the DC current Is, and input to the second inverter 40, where Is represents a conversion efficiency of the first inverter 30, and changes according to the carrier frequency $F_{c1}$ of the first inverter 30. As the carrier frequency $F_{c1}$ is increased, the switching loss (inverter loss) is increased and $\eta_1$ is decreased. As the carrier frequency $F_{c1}$ is decreased, the switching loss (inverter loss) is decreased and $\eta_1$ is increased.

At time zero (initial state), the battery current $I_1$ is output from the battery 10 as the battery current IB. As the voltage of the battery 10 is the battery voltage VB, the DC power represented by (battery voltage VB×$I_1$) is supplied from the battery 10 to the boosting converter 20. A sum of the DC power $(VH_1 \times Is) = Pg_0 \times \eta_1$ from the first inverter 30 and the DC power battery voltage $(VB \times I_1)$ from the battery 10 is supplied to the second inverter 40. The second inverter 40 outputs the received sum of the DC power by converting it into the supply power Pm (positive) that is supplied to the second motor generator 60. The power to be supplied to the second motor generator 60, therefore, is $Pm = ((VH_1 \times Is) + (\text{battery voltage VB} \times I_1)) \times \eta_2 = (Pg_0 \times \eta_1 \times \eta_2) + (\text{battery voltage VB} \times I_1 \times \eta_2)$, where $\eta_2$ is a conversion efficiency of the second inverter 40 and changes according to the carrier frequency $F_{c2}$ of the second inverter 40. As the carrier frequency $F_{c2}$ is increased, the switching loss (inverter loss) is increased and $\eta_2$ is decreased. As the carrier frequency $F_{c2}$ is decreased, the switching loss (inverter loss) is decreased and $\eta_2$ is increased. To compensate for a difference between the absolute value of the supplied power Pm (positive) supplied to the second motor generator 60 and the absolute value of the power $(Pg_0 \times \eta_1 \times \eta_2)$ supplied to the second motor generator 60 of the generated power $Pg_0$ (negative) generated by the first motor generator 50, the battery 10 supplies the DC power (battery voltage VB×$I_1$) to the boosting converter 20. At time zero, the carrier frequencies $F_{c1}$ and $F_{c2}$ of the first and second inverters 30, 40 are $C_0$.

The control unit 90 executes the boosting converter suspension program (boosting converter suspension means) 94 illustrated in FIG. 1. First, the control unit 90 obtains the battery current IB by the battery current sensor 83, as illustrated in step S101 of FIG. 3.

Figure 3:
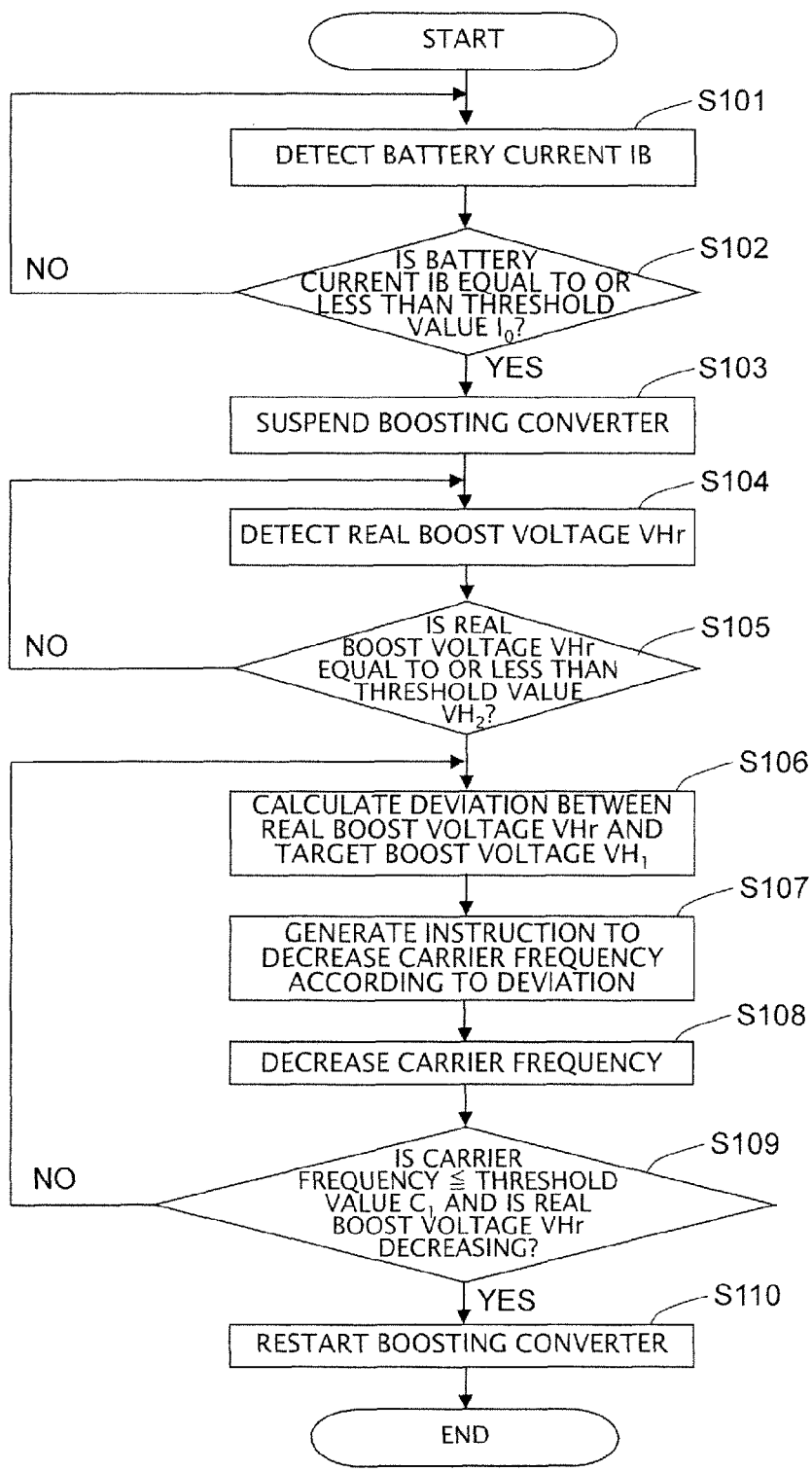
FIG. 3 is a flowchart illustrating an operation of the hybrid vehicle according to the embodiment of the present invention.

Next, the control unit 90 compares the battery current IB obtained by the battery current sensor 83 with a threshold value $I_0$, as illustrated in step S102 of FIG. 3. The threshold value $I_0$ is a current value at which the battery current IB is so small that the DC power output from the boosting converter 20; that is, the battery voltage VB×$I_0$, can be regarded as generally zero. Unless the battery current IB is equal to or less than the threshold value $I_0$, the process returns to step S101 of FIG. 3 and the control unit 90 continues monitoring the battery current IB.

Figure 4B:
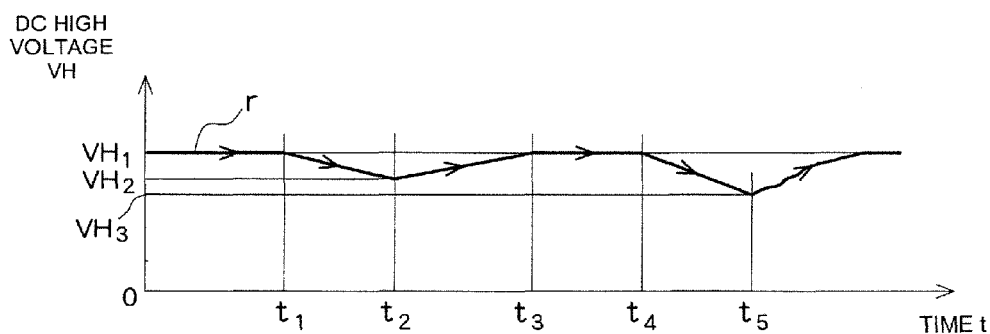
FIG. 4B is a graph illustrating a DC high voltage over time during the operation illustrated in FIG. 3.
Figure 4C:
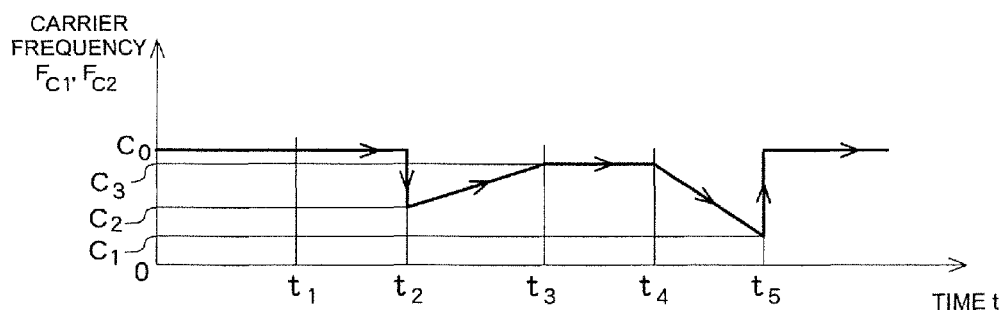
FIG. 4C is a graph illustrating carrier frequencies over time during the operation illustrated in FIG. 3.
Figure 5:
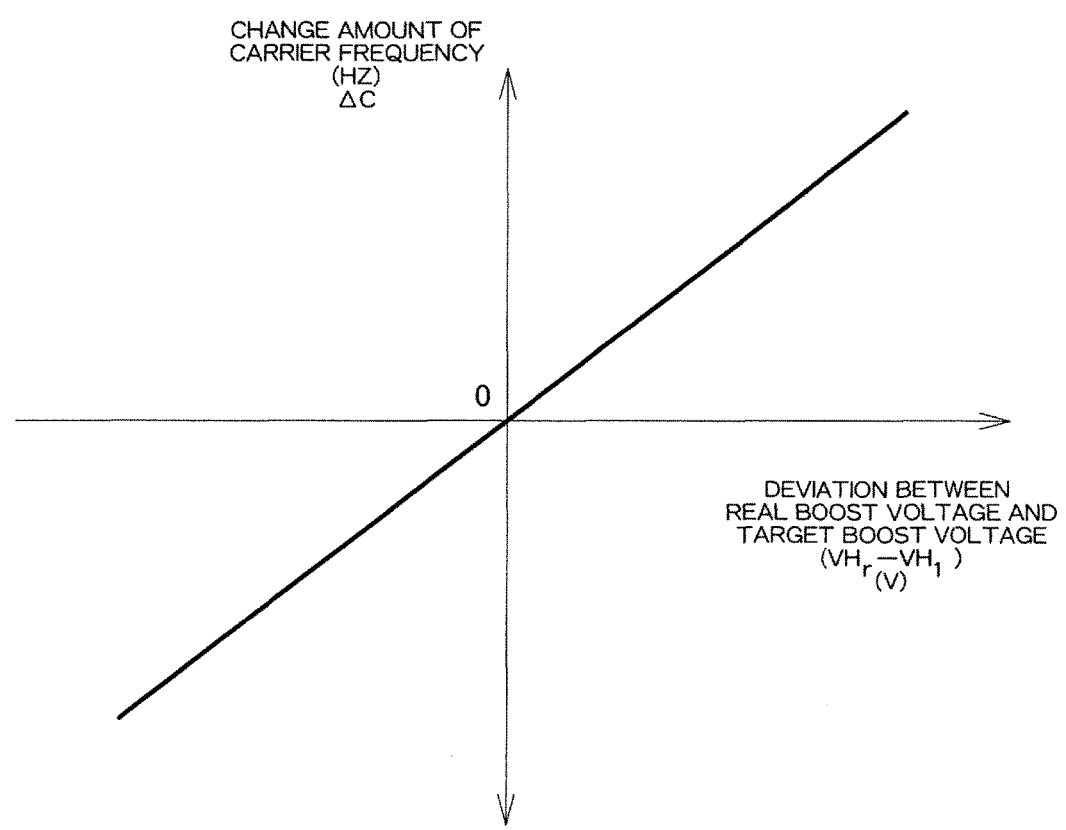
FIG. 5 is a map defining a change amount of the carrier frequency relative to a deviation between a real boost voltage and a target boost voltage during the operation illustrated in FIG. 3.

From time zero to time $t_1$, as illustrated in FIGS. 4A to 4C, when the supplied power Pm supplied to the second motor generator 60 is gradually decreased from the power of the initial state $Pm_0$, the battery current IB is also gradually decreased from $I_1$ of time zero, as illustrated in FIG. 4A. When the battery current IB is $I_0$ at time $t_1$ as illustrated in FIG. 4A, the control unit 90 determines that the battery current IB becomes equal to or less than the threshold value $I_0$, as illustrated in step S102 of FIG. 3. The control unit 90 then outputs an instruction to suspend the boosting converter 20, as illustrated in step S103 of FIG. 3. According to the instruction, the upper and lower arm switching elements 13, 14 of the boosting converter 20 are turned off and held in the off state, the connection between the boosting converter 20 and the first and second inverters 30, 40 is cut off, and the execution of the boosting converter suspension program (boosting converter suspension means) 94 is ended.

As mentioned above, since the absolute value of the supplied power $Pm_1$ (positive) supplied to the second motor generator 60 is larger than the absolute value of the power $(Pg_0 \times \eta_1 \times \eta_2)$ supplied to the second motor generator 60 of the generated power $Pg_0$ (negative) generated by the first motor generator 50 at time $t_1$ when the boosting converter 20 is suspended, the smoothing capacitor 23 discharges electricity equivalent to a difference between $Pm_1$ and $(Pg_0 \times \eta_1 \times \eta_2)$. Accordingly, as indicated by line r of FIG. 4B, the real boost voltage VHr gradually decreases from the target boost voltage $VH_1$ at or after time $t_1$.

The control unit 90 starts execution of the carrier frequency changing program (carrier frequency changing means) 95 illustrated in FIG. 1 at time $t_1$ of FIGS. 4A to 4C. As illustrated in step S104 of FIG. 3, the control unit 90 detects the real boost voltage VHr across the smoothing capacitor 23 by the high voltage sensor 85. The control unit 90 then determines whether the real boost voltage VHr is equal to or less than a first threshold voltage $VH_2$, as illustrated in step S105 of FIG. 3. Unless the real boost voltage VHr is equal to or less than the threshold voltage $VH_2$, the process returns to step S104 of FIG. 3 to continue monitoring of the real boost voltage VHr.

As indicated by line r of FIG. 4B, when the real boost voltage VHr has come to the first threshold voltage $VH_2$ at time $t_2$, the control unit 90 calculates a deviation between the target boost voltage $VH_1$ and the real boost voltage VHr detected by the high voltage sensor 85, as illustrated in step S106 of FIG. 3. As the real boost voltage VHr detected by the high voltage sensor 85 is the first threshold voltage $VH_2$ at time $t_2$, the deviation is $(VH_1-VH_2)$. As illustrated in step S107 of FIG. 3, the control unit 90 calculates a change amount $\Delta C$ of the carrier frequency corresponding to the deviation $(VH_1-VH_2)$ by referring to a map of FIG. 5 plotting the change amount $\Delta C$ of the carrier frequency relative to the deviation between the target boost voltage $VH_1$ and the real boost voltage VHr. The control unit 90 then generates an instruction to decrease the carrier frequency to change the carrier frequencies $F_{c1}$, $F_{c2}$ to $C_2$. As illustrated by step S108 of FIG. 3, the control unit 90 decreases the carrier frequencies $F_{c1}$, $F_{c2}$ of the first and second inverters from the initial state of $C_0$ to $C_2$. When the carrier frequencies of the first and second inverters 30, 40 has been decreased to $C_2$, the switching loss (inverter loss) of the first and second inverters 30, 40 is decreased, and the conversion efficiencies $\eta_1$, $\eta_2$ of the first and second inverters 30, 40 are increased to $\eta_{11}$, $\eta_{21}$, respectively. Accordingly, the absolute value of the power supplied to the second motor generator 60 of the generated power $Pg_0$ (negative) generated by the first motor generator 50 has become the power $(Pg_0 \times \eta_{11} \times \eta_{21})$, which has an absolute value larger than the supplied power $Pm_1$ (positive) supplied to the second motor generator 60. Accordingly, the smoothing capacitor 23 is charged with power equivalent to the difference between $Pm_1$ and $Pg_0 \times \eta_{11} \times \eta_{21}$. As a result, as indicated by line r of FIG. 4B, the real boost voltage VHr gradually increases at or after time $t_2$ from the first threshold voltage $VH_2$ to approach the target boost voltage $VH_1$.

Next, as illustrated in step 109 of FIG. 3, the control unit 90 determines whether the carrier frequencies $F_{c1}$, $F_{c2}$ are restricted to or below the lower limit carrier frequency (lower threshold value) $C_1$, and also determines whether the real boost voltage VHr is decreasing. The lower limit carrier frequency (lower threshold value) $C_1$ is, for example, a frequency within the audible band in which generation of noise from the inverters 30, 40 can be sensed. The carrier frequencies $F_{c1}$, $F_{c2}$ are $C_2$ at time $t_2$ in FIG. 4C, which is higher than the lower limit carrier frequency $C_1$, and the real boost voltage VHr is increasing. Accordingly, the process returns to step S106 of FIG. 3, and the control unit 90 repeats the steps S106 to S109 of FIG. 3, by referring to the map illustrated in FIG. 5, to change the carrier frequencies $F_{c1}$, $F_{c2}$.

As indicated by line r of FIG. 4B, as the real boost voltage VHr detected by the high voltage sensor 85 increases at or after time $t_2$, the deviation between the target boost voltage $VH_1$ and the real boost voltage VHr detected by the high voltage sensor 85 is gradually decreased. The control unit 90 increases the carrier frequencies $F_{c1}$, $F_{c2}$ to be higher than $C_2$ at time $t_2$ (or make them approach the initial state of $C_0$) by referring to the map of FIG. 5 as the deviation is decreased. Since the conversion efficiencies $\eta_1$, $\eta_2$ of the inverters 30, 40 have become smaller than $\eta_{11}$, $\eta_{21}$ at time $t_2$ when the carrier frequencies $F_{c1}$, $F_{c2}$ come to $C_2$, the power $(Pg_0 \times \eta_1 \times \eta_2)$ supplied to the motor generator 60 of the generated power $Pg_0$ (negative) generated by the first motor generator 50 is gradually decreased, and causes the deviation between the target boost voltage $VH_1$ and the boost voltage VHr to gradually approach zero.

As illustrated in FIGS. 4B and 4C, when the carrier frequencies $F_{c1}$, $F_{c2}$ come to $C_3$ at time $t_3$, the conversion efficiencies $\eta_1$, $\eta_2$ of the first and second inverters 30, 40 has come to $\eta_{13}$, $\eta_{23}$. Accordingly, the power supplied to the second motor generator 60 of the generated power $Pg_0$ (negative) generated by the first motor generator 50 becomes $(Pg_0 \times \eta_{13} \times \eta_{23})$ which has an opposite sign from and the same absolute value as that of the supplied power $Pm_1$ (positive) supplied to the second motor generator 60. As a result, the discharging power Pc of the smoothing capacitor 23 comes to zero, and the real boost voltage VHr detected by the high voltage sensor 85 at or after time $t_3$ is held at the target boost voltage $VH_1$ to allow the suspension state of the boosting converter 20.

When a driver depresses an accelerator of the hybrid vehicle 100 at time $t_4$ in FIG. 4A, a depression amount of the accelerator pedal detected by the accelerator pedal depression amount detecting sensor 87 is increased. Accordingly, the control unit 90 determines that there has been a request to increase the driving torque, and outputs an instruction to increase the motor torque Tm of the second motor generator 60. According to the instruction, the power Pm supplied to the second motor generator 60 is increased at or after time $t_4$, and the power $(Pg_0 \times \eta_1 \times \eta_2)$ supplied to the second motor generator 60 of the generated power $Pg_0$ of the first motor generator 50 becomes smaller than the power Pm supplied to the second motor generator 60 from the second inverter 40. This insufficiency in power is compensated for by discharging power Pc obtained by the discharge of the smoothing capacitor 23, such that the real boost voltage VHr is decreased, as illustrated by line r of FIG. 4B. As a result, the deviation between the target boost voltage $VH_1$ and the real boost voltage VHr is gradually increased. As the deviation between the real boost voltage VHr and the target boost voltage $VH_1$ is increased, the control unit 90 increases the change amount $\Delta C$ of the carrier frequencies of the first and second inverters 30, 40 and decreases the carrier frequencies $F_{c1}$, $F_{c2}$ from $C_3$, according to the map of FIG. 5.

However, if the increase of the power $(Pg_0 \times \eta_1 \times \eta_2)$ supplied to the second motor generator 60 of the generated power $Pg_0$ of the first motor generator 50 caused by the increase of the carrier frequencies $F_{c1}$, $F_{c2}$ is greater than the increase of the power Pm supplied to the second motor generator 60, the real boost voltage VHr continues to decrease even when the carrier frequencies $F_{c1}$, $F_{c2}$ are decreased, as illustrated from time $t_4$ to time $t_5$ of FIG. 4C. As indicated at time $t_5$ of FIGS. 4B and 4C, when the real boost voltage VHr continues to decrease even though the carrier frequencies $F_{c1}$, $F_{c2}$ of the first and second inverters 30, 40 are decreased to the lower limit carrier frequency (lower limit threshold value) $C_1$, the control unit 90 determines that the real boost voltage VHr is decreasing even at the lower limit carrier frequency of the carrier frequencies $F_{c1}$, $F_{c1}$, as illustrated in step S109 of FIG. 3. The control unit 90 restarts the boosting converter 20, as illustrated in step S110 of FIG. 3.

Upon restart of the boosting converter 20, the control unit 90 returns the carrier frequencies $F_{c1}$, $F_{c2}$ of the first and second inverters 30, 40 to the initial value $C_0$ and resumes the normal control operation. When the boosting converter 20 is restarted, the battery 10 supplies power to the second motor generator 60 such that the real boost voltage is increased until it reaches the target boost voltage $VH_1$.

As described above, the hybrid vehicle 100 of the present embodiment can maintain the suspended state of the boosting converter 20 by adjusting the carrier frequencies $F_{c1}$, $F_{c2}$ of the first and second inverters 30, 40 to hold the DC high voltage VH near the target boost voltage $VH_1$ during the suspended state of the boosting converter 20, instead of the conventional method of changing the driving torque of the vehicle. Accordingly, it is possible to effectively improve efficiency of the system of the hybrid vehicle 100 (electric vehicle) by increasing the suspended time of the boosting converter, while maintaining drivability of the vehicle.

Next, by reference to FIGS. 6 and 7, another operation of the hybrid vehicle 100 according to the present embodiment will be described. Similar parts corresponding to those described above by referring to FIGS. 3 to 5 will be described only briefly. As illustrated in FIGS. 7A to 7C, the operation is performed at time $t_1$ when the boosting converter 20 is suspended. At this time, the absolute value of the power $Pm_1$ (positive) supplied to the second motor generator 60 is smaller than the absolute value of the power ($Pg_0 \times \eta_1 \times \eta_2$) supplied to the second motor generator 60 of the generated power $Pg_0$ (negative) generated by the first motor generator 50. The smoothing capacitor 23 is charged with power equivalent to the difference between $Pm_1$ and ($Pg_0 \times \eta_1 \times \eta_2$), such that the real boost voltage VHr is gradually increased from the target boost voltage $VH_1$ at or after time $t_1$, as indicated by line r of FIG. 7B. In this operation, the conversion frequencies $\eta_1$, $\eta_2$ of the first and second inverters 30, 40 are decreased by increasing the carrier frequencies $F_{c1}$, $F_{c2}$ thereof to increase the inverter loss of the first and second inverters 30, 40, while the power ($Pg_0 \times \eta_1 \times \eta_2$) supplied to the second motor generator 60 of the generated power $Pg_0$ (negative) of the first motor generator 50 is decreased. As a result, the real boost voltage VHr is held near the target boost voltage $VH_1$, and the suspended state of the boosting converter 20 is maintained.

Figure 6:
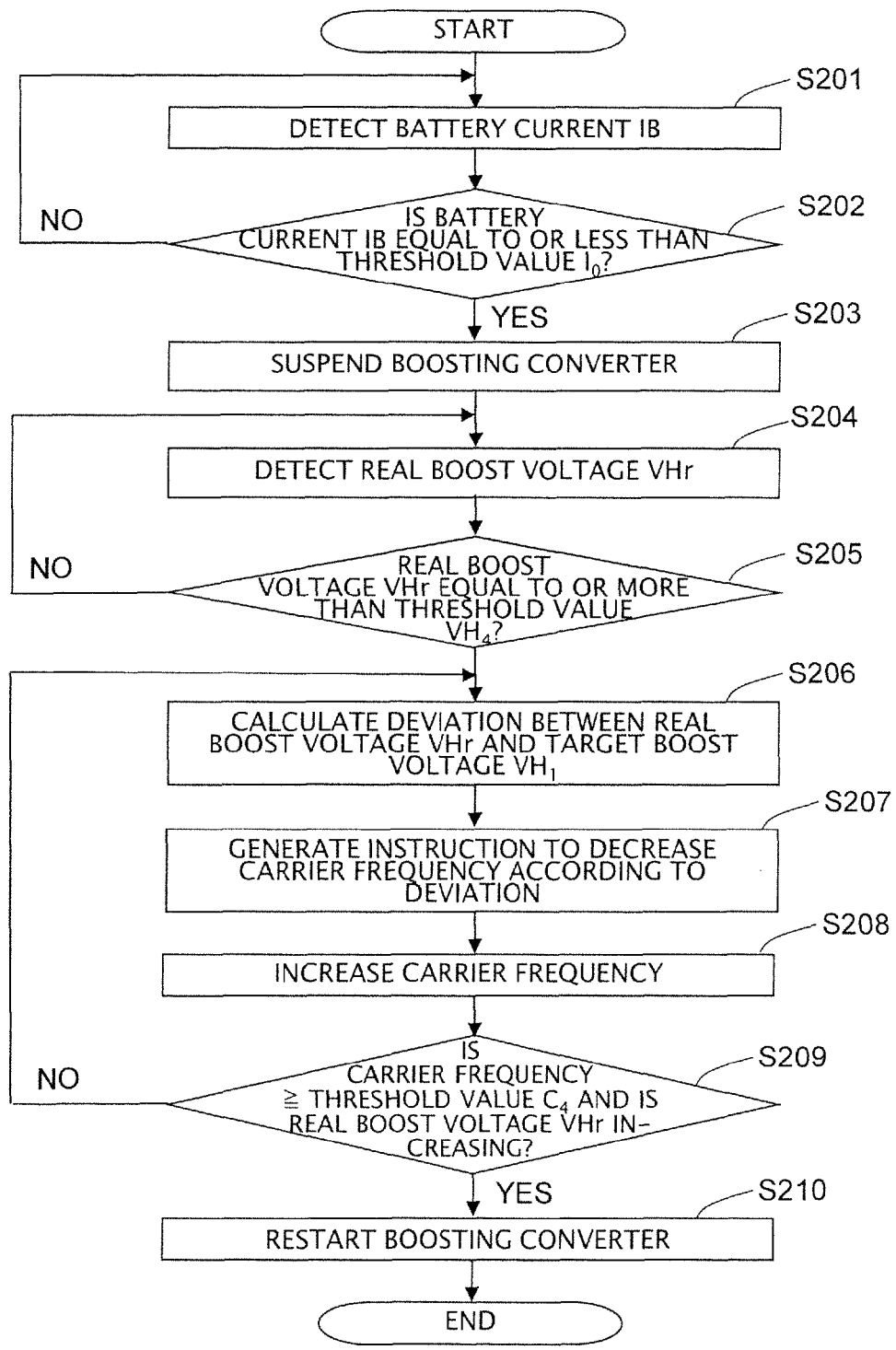
FIG. 6 is a flowchart illustrating another operation of the hybrid vehicle according to the embodiment of the present invention.
Figure 7A:
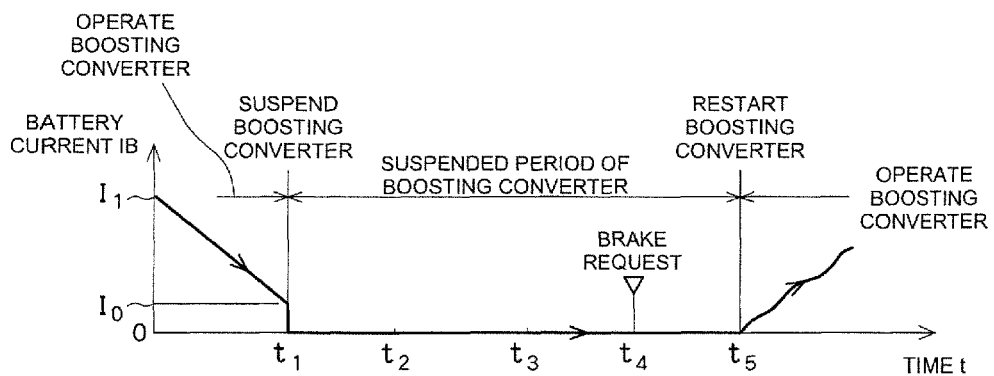
FIG. 7A is a graph illustrating a battery current over time during the operation illustrated in FIG. 6.
Figure 7B:
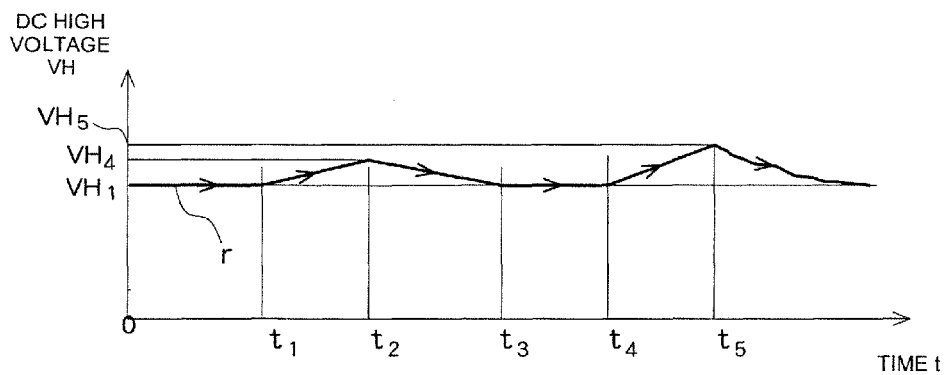
FIG. 7B is a graph illustrating a DC high voltage over time during the operation illustrated in FIG. 6.
Figure 7C:
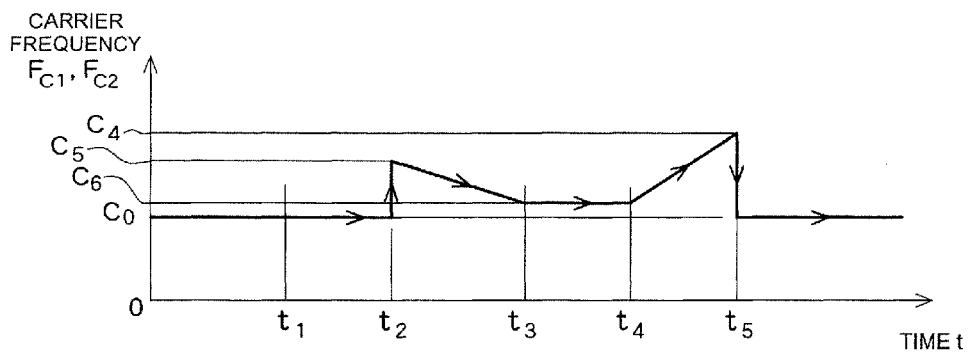
FIG. 7C is a graph illustrating carrier frequencies over time during the operation illustrated in FIG. 6.

Similar to the description above by reference to FIG. 3, the control unit 90 monitors the battery current IB and suspends the boosting converter 20 when the battery current IB is equal to or less than the threshold value $I_0$, as illustrated in steps S201 to S205 of FIG. 6. Next, the control unit 90 executes the carrier frequency changing program (carrier frequency changing means) 95. When the real boost voltage VHr is equal to or larger than a second threshold voltage $VH_4$, the control unit 90 increases, as illustrated in steps S206 to S208 of FIG. 6, the carrier frequencies $F_{c1}$, $F_{c2}$ of the first and second inverters 30, 40 from $C_0$ to $C_5$, at time $t_2$ of FIG. 7C, and decreases the real boost voltage VHr from $VH_4$, as indicated by line r of FIG. 7B. After that, the control unit 90 repeats the steps S206 to S209 of FIG. 6 to gradually decrease the carrier frequencies $F_{c1}$, $F_{c2}$ of the first and second inverters 30, 40 from $C_5$ toward $C_6$, as indicated by line r between time $t_2$ and $t_3$ of FIG. 7B, to make the real boost voltage VHr approach the target boost voltage $VH_1$. With the carrier frequencies $F_{c1}$, $F_{c2}$ of the first and second inverters 30, 40 being at $C_6$ at time $t_3$, the power $Pm_1$ (positive) supplied to the second motor generator 60 becomes the power that has the same power as and an opposite sign from the power ($Pg_0 \times \eta_1 \times \eta_2$) supplied to the second motor generator 60 of the generated power $Pg_0$ (negative) generated by the first motor generator 50. The real boost voltage VHr is then held at the target boost voltage $VH_1$. At time $t_4$ of FIG. 7, the brake pedal is depressed to input regenerative power from the second motor generator 60 to the second inverter 40. When the real boost voltage VHr is increased, the control unit 90 increases the carrier frequencies $F_{c1}$, $F_{c2}$ of the first and second inverters 30, 40. As indicated at time $t_5$ of FIG. 7C, even when the carrier frequencies $F_{c1}$, $F_{c2}$ of the first and second inverters 30, 40 are at the upper limit carrier frequency $C_4$, the process proceeds from step S209 to step S210 of FIG. 6, so long as the real boost voltage VHr is increasing. The boosting converter 20 is then restarted to return to the normal operation. Similar to the operation described above, this operation also adjusts the carrier frequencies $F_{c1}$, $F_{c2}$ of the first and second inverters 30, 40 to hold the DC high voltage VH to be near the target boost voltage $VH_1$ during the suspended state of the boosting converter, instead of changing the driving torque of the vehicle as in the conventional method. Therefore, it is possible to effectively improve efficiency of the system of the hybrid vehicle (electric vehicle) 100 by suspending the boosting converter 20, while maintaining drivability of the vehicle.

Next, by reference to FIGS. 8 to 10, another operation of the hybrid vehicle 100 according to the present embodiment will be described. In the operation described above by reference to FIGS. 3 to 7, the carrier frequencies $F_{c1}$, $F_{c2}$ of the first and second inverters 30, 40 have been increased or decreased simultaneously. In this operation, however, the carrier frequency $F_{c1}$ of the first inverter 30 and the carrier frequency $F_{c2}$ of the second inverter 40 are decreased separately.

In this operation, one of the carrier frequencies of the first and second inverters 30, 40 having a larger decreasable amount of the inverter loss caused by the decrease of the carrier frequency is first decreased. If the real boost voltage VHr continues to decrease even when the carrier frequency of this inverter has been decreased to the lower limit carrier frequency, then the carrier frequency of the other inverter is decreased. Since the motor generator having a larger number of revolutions is set to have a higher carrier frequency, the inverter connected to the first or the second motor generator 50, 60 having a larger number of revolutions has a higher carrier frequency when the boosting converter 20 is suspended. As described above, only the carrier frequencies $F_{c1}$, $F_{c2}$ of the first and second inverters 30, 40 can be decreased to the lower limit carrier frequency at the maximum, as the generation of noise has to be restricted. The decreasable amount of the carrier frequency of each inverter is given as a difference between the carrier frequency corresponding to the number of revolutions of the motor generator and the lower limit carrier frequency. Therefore, the inverter connected to the motor generator having a larger number of revolutions has a larger decreasable amount of the carrier frequency, and the decrease of the inverter loss becomes bigger. In addition, the inverter converts larger power as the torque of the motor generator is increased, and the decrease of the inverter loss becomes bigger when the carrier frequency is decreased. The first or second power generator having a larger number of revolutions and higher torque attains a larger decreasable amount of the inverter loss. The first or second power generator having a smaller number of revolutions and lower torque attains a smaller decreasable amount of the inverter loss.

Accordingly, the carrier frequency of the inverter of the one of the first and second motor generators 50, 60 having a higher number of revolutions, higher torque, and a larger decreasable amount of the inverter loss is decreased first. If the real boost voltage VHr still decreases even when the carrier frequency of this inverter has been decreased to the lower limit frequency, the carrier frequency of the other inverter is decreased. By decreasing the carrier frequencies $F_{c1}$, $F_{c2}$ of the first and second inverters 30, 40 separately in this manner, overshoot of the real boost voltage VHr beyond the target boost voltage $VH_1$ can be restricted, thereby allowing the real boost voltage VHr to smoothly reach the target boost voltage $VH_1$.

In the operation of an example described below, when the boosting converter 20 is suspended, the first motor generator 50 has a larger number of revolutions and higher torque than the second motor generator 60, and the first inverter 30 has a larger decreasable amount of the inverter loss. Therefore, the carrier frequency $F_{c1}$ of the first inverter 30 is first decreased, followed by decreasing the carrier frequency $F_{c2}$ of the second inverter 40. Alternatively, if the second motor generator 60 has a higher number of revolutions and higher torque than the first motor generator 50 when the boosting converter 20 is suspended, the carrier frequency $F_{c2}$ of the second inverter 40 may be decreased first, followed by the decrease of the carrier frequency $F_{c1}$ of the first inverter 40. In the description below, similar parts corresponding to those described by reference to FIGS. 3 to 5 above will be described only briefly.

Figure 10A:
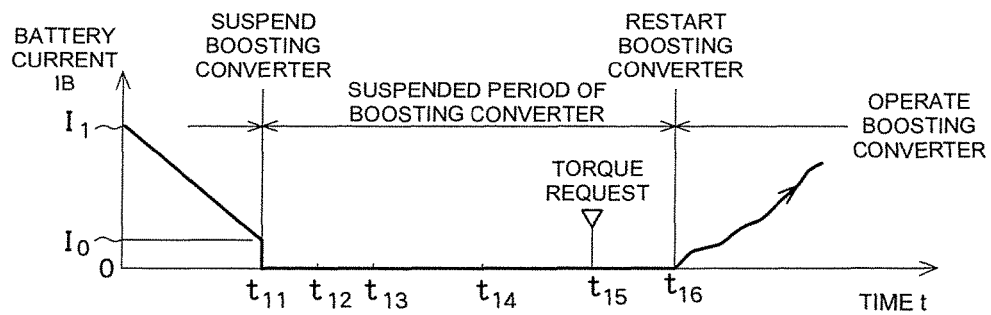
FIG. 10A is a graph illustrating a battery current over time during the operation illustrated in FIGS. 8 and 9.
Figure 10B:
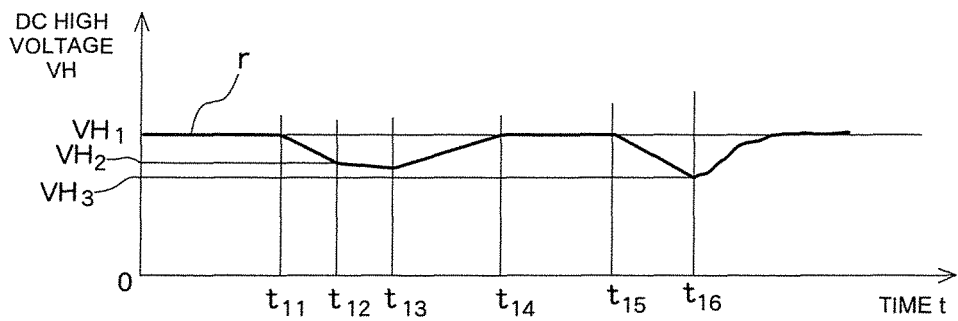
FIG. 10B is a graph illustrating a DC high voltage over time during the operation illustrated in FIGS. 8 and 9.
Figure 10C:
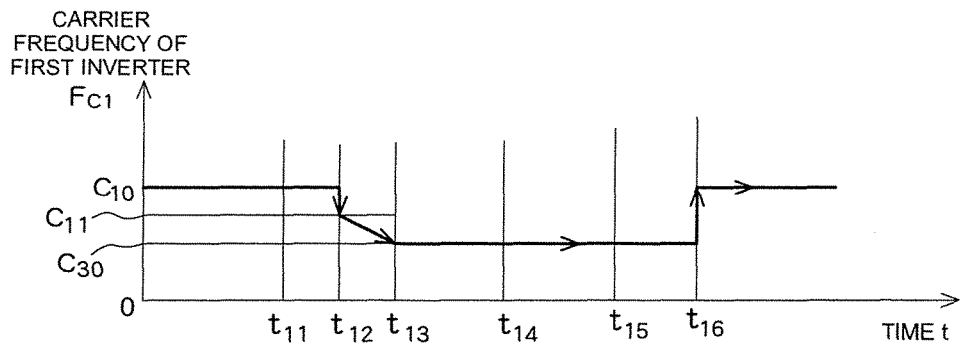
FIG. 10C is a graph illustrating a carrier frequency of a first inverter over time during the operation illustrated in FIGS. 8 and 9.
Figure 10D:
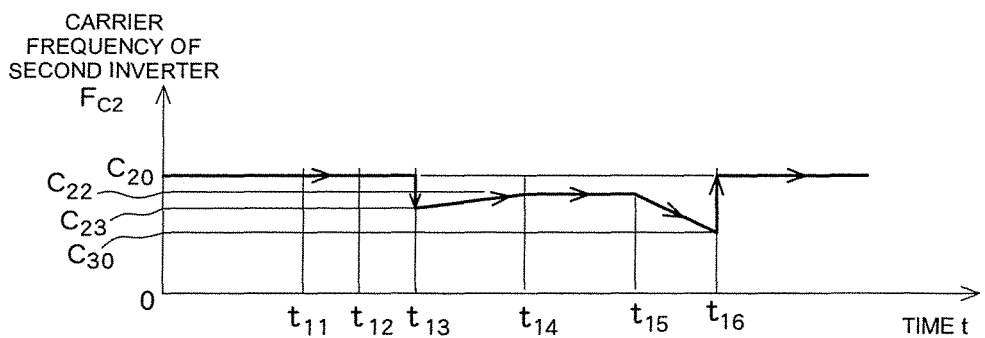
FIG. 10D is a graph illustrating a carrier frequency of a second inverter over time during the operation illustrated in FIGS. 8 and 9.

In the operation of this example, as illustrated in FIGS. 10C and 10D, the carrier frequency $F_{c1}$ of the first inverter 30 is $C_{10}$ and the carrier frequency $F_{c2}$ of the second inverter 40 is $C_{20}$ between the initial state at time zero and time $t_1$ when the boosting converter 20 is suspended. Similar to the above description given by reference to FIG. 3, the control unit 90 monitors the battery current IB, as illustrated in steps S301 and S302 of FIG. 8. When the battery current IB has become equal to or less than the threshold value $I_0$, the boosting converter 20 is suspended as illustrated in step S303 of FIG. 8. Next, the control unit 90 executes the carrier frequency changing program (carrier frequency changing means) 95, and determines the order of inverters whose carrier frequencies are to be decreased when the real boost voltage VHr has become equal to or less than the first threshold voltage $VH_2$, as illustrated in steps S304 to S306 of FIG. 8 and indicated by line r of FIG. 10B.

A process to determine the order of inverters whose carrier frequencies are to be decreased will be described by reference to FIG. 9. As illustrated in step S321 of FIG. 9, the control unit 90 obtains the number of revolutions of the first and second motor generators 50, 60 from detection signals of the resolvers 51, 61 illustrated in FIG. 1. Next, the control unit 90 obtains torque command values of the first and second motor generators 50, 60 from the control data 96 of the control unit 90, as illustrated in step S322 of FIG. 9. The control unit 90 then calculates decreasable amounts of the inverter loss of the first and second inverters 30, 40, respectively, as illustrated in step S323 of FIG. 9. A decreasable amount $DN_{INV}$ of the inverter loss may be calculated, for example, by determining a difference between the carrier frequency at the time of suspending the boosting converter 20 and the lower limit carrier frequency, and multiplying the difference by a torque command value T* and a coefficient. In the operation of this example, a decreasable amount $DN_{INV1}$ of the inverter loss of the first inverter 30 is calculated from the carrier frequency $C_{10}$ of the first inverter 30 at the time of suspending the boosting converter 20, the lower limit carrier frequency $C_{30}$, the torque command value Tg* of the first motor generator 50, and a coefficient $K_1$ by:

$$DN_{INV1}=(C_{10}-C_{30})\times Tg^*\times K_1 \quad \text{(Equation 1)}$$

A decreasable amount $DN_{INV2}$ of the inverter loss of the second inverter is calculated from the carrier frequency $C_{20}$ of the second inverter 40 at the time of suspending the boosting converter 20, the lower limit carrier frequency $C_{30}$, a torque command value Tm* of the second motor generator 60, and a coefficient $K_2$ by:

$$DN_{INV2}=(C_{20}-C_{30})\times Tm^*\times K_2 \quad \text{(Equation 2)}$$

Figure 9:
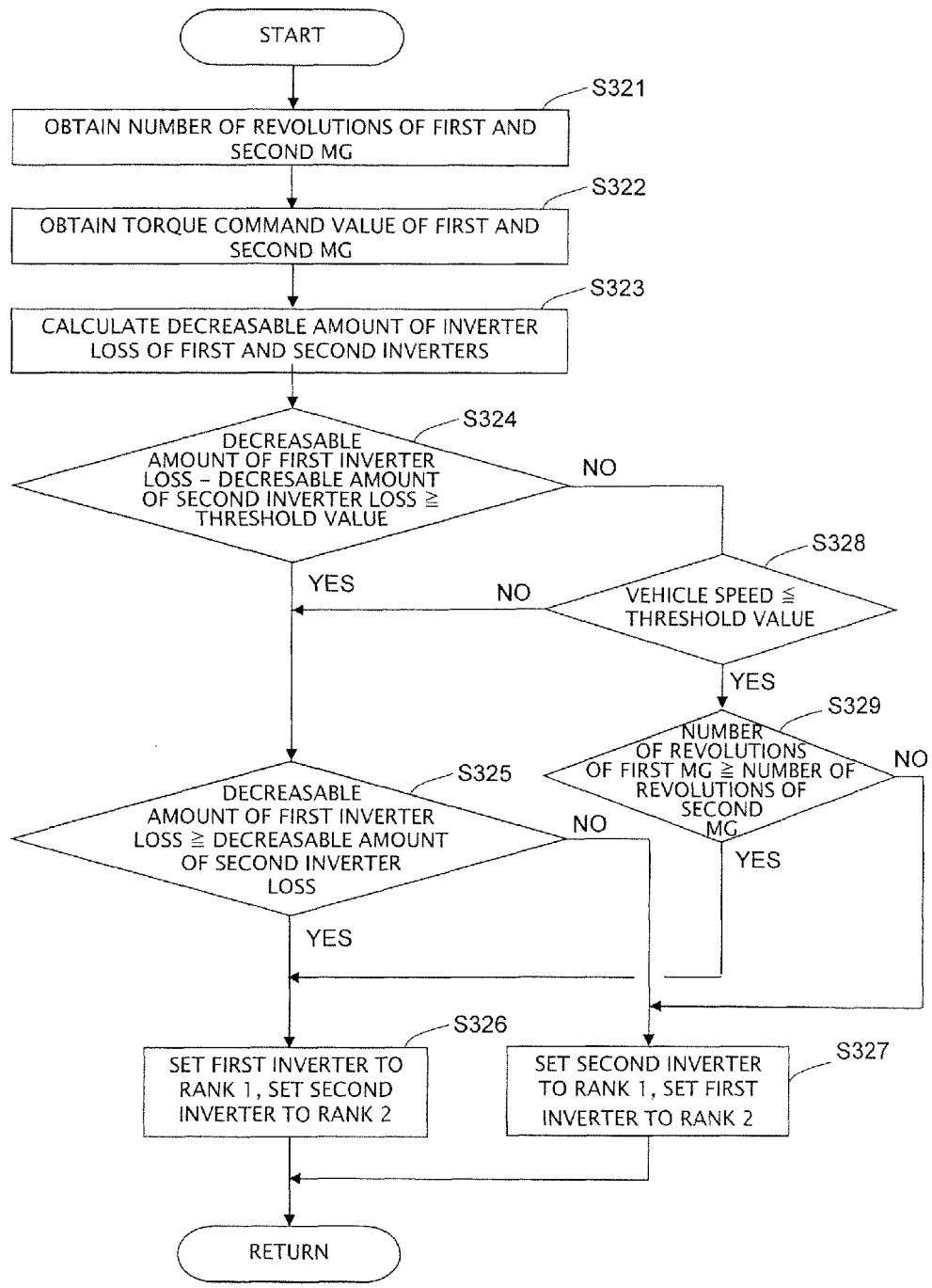
FIG. 9 is a flowchart illustrating another operation of the hybrid vehicle according to the embodiment of the present invention.

Next, the control unit 90 determines whether the difference between the decreasable amount $DN_{INV1}$ of the inverter loss of the first inverter 30 and the decreasable amount $DN_{INV2}$ of the inverter loss of the first inverter 40 is equal to or larger than a predetermined threshold value, as illustrated in step S324 of FIG. 9. If the difference is equal to or larger than a predetermined threshold value, the process proceeds to step S325 of FIG. 9 to determine a magnitude relationship between the decreasable amount $DN_{INV1}$ of the inverter loss of the first inverter 30 and the decreasable amount $DN_{INV2}$ of the inverter loss of the second inverter 40. If it is determined that the decreasable amount $DN_{INV1}$ of the inverter loss of the first inverter 30 is larger than the decreasable amount $DN_{INV2}$ of the inverter loss of the second inverter 40, the control unit 90 sets the first inverter 30 to rank 1 and sets the second inverter 40 to rank 2, as illustrated in step S326 of FIG. 9. In contrast, if it is determined in step S325 of FIG. 9 that the decreasable amount $DN_{INV2}$ of the inverter loss of the second inverter 40 is larger than the decreasable amount $DN_{INV1}$ of the inverter loss of the first inverter 30, the control unit 90 sets the second inverter 40 to rank 1 and sets the first inverter 30 to rank 2, as illustrated in step S327 of FIG. 9.

In step S324 of FIG. 9, if the difference between the decreasable amount $DN_{INV1}$ of the inverter loss of the first inverter 30 and the decreasable amount $DN_{INV2}$ of the inverter loss of the second inverter 40 is less than the predetermined threshold value, the control unit 90 advances the process to step S328 of FIG. 9 and determines whether the vehicle speed of the hybrid vehicle 100 detected by the vehicle speed sensor 86 is equal to or less than a predetermined threshold value (whether the hybrid vehicle is traveling at a low speed). As illustrated in step S328 of FIG. 9, if the vehicle speed is equal to or less than the predetermined threshold value, the process proceeds to step S329 of FIG. 9 to compare the magnitude of the numbers of revolutions of the first and second motor generators 50, 60. Accordingly, the inverter connected to the motor generator having a larger number of revolutions is set to rank 1, and the other inverter is set to rank 2, as illustrated in steps S326, 327. By decreasing the carrier frequency of the inverter connected to the motor generator having a larger number of revolutions during low speed traveling of the hybrid vehicle 100, a restriction is imposed that the carrier frequency is decreased down to the audible band to become a noise source.

In the operation of this example, the number of revolutions of the first motor generator 50 is higher than that of the second motor generator 60, the carrier frequency $C_{10}$ of the first inverter 30 is higher than the carrier frequency $C_{20}$ of the second inverter 40 ($C_{10}>C_{20}$), and the torque command value Tg* of the first motor generator 50 is larger than the torque command value Tm* of the second motor generator 60. Therefore, the decreasable amount $DN_{INV1}$ of the inverter loss of the first inverter 30 is larger than the decreasable amount $DN_{INV2}$ of the inverter loss of the second inverter 40. If the difference between these decreasable amounts is larger than the threshold value, the control unit 90 sets the first inverter 30 to rank 1 and sets the second inverter 40 to rank 2, as illustrated in step S326 of FIG. 9. Since the number of revolutions of the first motor generator 50 is higher than that of the second motor generator 60 in the operation of this example, even when the difference between $DN_{INV1}$ and $DN_{INV2}$ is less than the predetermined threshold value, the first inverter 30 is set to rank 1 and sets the second inverter 40 to rank 2 in step S329 of FIG. 9. Since the first inverter 30 has been set to rank 1 and the second inverter 40 to rank 2 in steps S325 and S329 of FIG. 9 in the operation of this example, the first inverter 30 is set to rank 1 and the second inverter 40 is set to rank 2, regardless of the determination of the vehicle speed in step S328.

Figure 8:
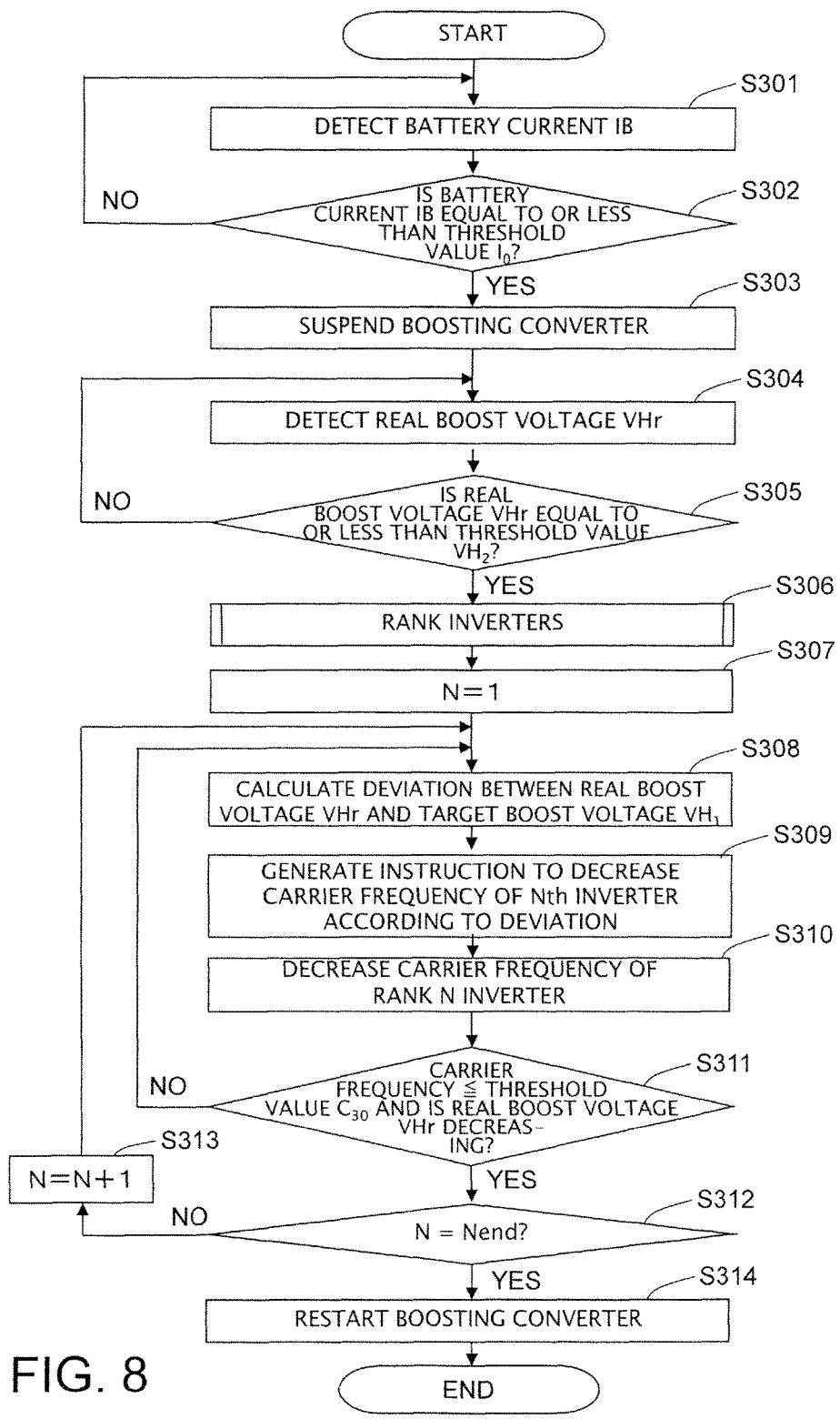
FIG. 8 is a flowchart illustrating another operation of the hybrid vehicle according to the embodiment of the present invention.

When the first inverter 30 has been set to rank 1 and the second inverter 40 to rank 2 as described above, the control unit 90 sets an inverter rank N whose carrier frequency should be decreased as N=1, as illustrated in step S307 of FIG. 8. Next, the control unit 90 decreases the carrier frequency $F_{c1}$ of the first inverter 30 of the rank 1 at time $t_{12}$ of FIG. 10C from $C_{10}$ to $C_{11}$, as illustrated in steps S308 to S310 of FIG. 8. However, as indicated by line r of FIG. 10B, decreasing the carrier frequency $F_{c1}$ of the first inverter 30 from $C_{10}$ to $C_{11}$ is not enough to prevent the state where the absolute value of the power $(Pg_0 \times \eta_1 \times \eta_2)$ supplied to the second motor generator 60 of the generated power $Pg_0$ (negative) generated by the first motor generator 50 is larger than the absolute value of the power $Pm_1$ (positive) supplied to the second motor generator 60. As a result, the real boost voltage VHr continues to decrease as indicated by line r of FIG. 10B. As the deviation between the real boost voltage VHr and the target boost voltage $VH_1$ increases over time, the control unit 90 repeats steps S308 to S311 of FIG. 8 by referring to the map of FIG. 5 to further decrease the carrier frequency $F_{c1}$ of the first inverter 30 from time $t_{12}$ toward time $t_{13}$ of FIG. 10C. However, the real boost voltage VHr still continues to decrease, as indicated by line r of FIG. 10B.

When the carrier frequency $F_{c1}$ of the first inverter 30 reaches the lower limit carrier frequency (lower limit threshold value) $C_{30}$ at time $t_{13}$ of FIG. 10C, the control unit 90 determines, as illustrated in step S311 of FIG. 8, that the carrier frequency $F_{c1}$ of the first inverter 30 has reached the lower limit carrier frequency (lower limit threshold value) $C_{30}$, and that the real boost voltage VHr still continues decreasing. Accordingly, the process proceeds to step S312 of FIG. 8 to determine whether the rank N of the inverter whose carrier frequency should be decreased is not in the final rank. Since two inverters are present in the embodiment, where rank 2 is the final rank and rank 1 is the current rank, the control unit 90 determines that the rank N of the inverter whose carrier frequency should be decreased is not the final rank. Accordingly, the process proceeds to step S313 of FIG. 8 to increment the rank of the inverter whose carrier frequency should be decreased by 1. That is, the second inverter that has been set to rank 2 is now set as the inverter whose carrier frequency should be decreased. Then the process returns to step S308 of FIG. 8.

Next, at time $t_{13}$ of FIG. 10D, the control unit 90 decreases the carrier frequency $F_{c2}$ of the second inverter 40 from $C_{20}$ to $C_{23}$, as illustrated in steps S308 to S310 of FIG. 8. As a result, the absolute value of the power $(Pg_0 \times \eta_1 \times \eta_2)$ supplied to the second motor generator 60 of the generated power $Pg_0$ (negative) generated by the first motor generator 50 is larger than the absolute value of the supplied power $Pm_1$ (positive) supplied to the second motor generator 60. The real boost voltage VHr then starts to increase, as indicated by line r of FIG. 10B. At this time, the control unit 90 holds the carrier frequency $F_{c1}$ of the first inverter 30 at the lower limit carrier frequency $C_{30}$.

Subsequently, the control unit 90 repeats steps S308 to S311 of FIG. 8 between time $t_{13}$ and time $t_{14}$. As indicated by time $t_{13}$ to time $t_{14}$ of FIG. 10C, while the carrier frequency $F_{c1}$ of the first inverter 30 is held at the lower limit carrier frequency $C_{30}$, the carrier frequency $F_{c2}$ of the second inverter 40 is gradually increased from $C_{23}$ toward $C_{22}$, as illustrated by FIG. 10D. This makes the real boost voltage VHr approach the target boost voltage $VH_1$. At time $t_{14}$, the carrier frequency $F_{c2}$ of the second inverter 40 comes to $C_{22}$, as illustrated in FIG. 10D, where the power $Pm_1$ (positive) supplied to the second motor generator 60 becomes the power having the same power as and the opposite sign from $(Pg_0 \times \eta_1 \times \eta_2)$ supplied to the second motor generator 60 of the power $Pg_0$ (negative) generated by the first motor generator 50. The real boost voltage VHr is held at the target boost voltage $VH_1$, as illustrated in FIG. 10B, to maintain the suspended state of the boosting converter 20.

When the accelerator is depressed at time $t_{15}$ of FIG. 10A, the power Pm supplied to the second motor generator 60 is increased and the real boost voltage VHr is decreased. The control unit 90 then decreases the carrier frequency $F_{c2}$ of the second inverter 40 from $C_{22}$. As indicated at time $t_{16}$ of FIG. 10C, if the real boost voltage VHr is still decreasing even when the carrier frequency $F_{c2}$ of the second inverter 40 has come to the lower limit carrier frequency $C_{30}$, the process proceeds to step S312 from step S311 of FIG. 8 to determine whether the rank N of the inverter whose carrier frequency should be decreased is the rank N. Since the current rank N is 2, which is the final rank, the process proceeds to step S314 where the control unit 90 restarts the boosting converter 20 and returns to the normal operation.

Similar to the operation described above, this operation can also maintain the suspended state of the boosting converter 20 by adjusting the carrier frequencies $F_{c1}$, $F_{c2}$ of the first and second inverters 30, 40 to hold the DC high voltage VH to be near the target boost voltage $VH_1$ during the suspended state of the boosting converter 20, instead of changing the driving torque of the vehicle as in the conventional technique. Accordingly, it is possible to effectively improve efficiency of the system of the hybrid vehicle (electric vehicle) 100 by increasing the suspended time of the boosting converter 20, while maintaining drivability of the vehicle. In this operation, by separately decreasing the carrier frequencies $F_{c1}$ and $F_{c2}$ of the first and second inverters 30, 40, overshoot of the real boost voltage VHr beyond the target boost voltage $VH_1$ can be restricted, which causes the real boost voltage VHr to smoothly reach the target boost voltage $VH_1$.

Next, by reference to FIGS. 11 to 13, another operation of the present embodiment will be described. Similar to the operation described above by reference to FIGS. 6 and 7, the operation of this example is performed when the absolute value of the power $Pm_1$ (positive) supplied to the second motor generator 60 when the boosting converter 20 is suspended at time $t_{11}$ is smaller than the absolute value of the power $(Pg_0 \times \eta_1 \times \eta_2)$ supplied to the second motor generator 60 of the power $Pg_0$ (negative) generated by the first motor generator 50. The smoothing capacitor 23 is charged with power equivalent to the difference between the power $Pm_1$ and the power ($Pg_0 \times \eta_1 \times \eta_2$). The real boost voltage VHr is gradually increased after time $t_{11}$ from the target boost voltage $VH_1$, as indicated by line r of FIG. 13B. In the operation of this example, as illustrated in FIGS. 13C and 13D, the conversion efficiencies $\eta_1$, $\eta_2$ of the first and second inverters 30, 40 are decreased by sequentially increasing the carrier frequencies $F_{c1}$, $F_{c2}$ of the first and second inverters 30, 40. The inverter losses of the first and second inverters 30, 40 are increased and the power ($Pg_0 \times \eta_1 \times \eta_2$) supplied to the second motor generator 60 of the power $Pg_0$ (negative) of the first motor generator 50 is decreased. As a result, the real boost voltage VHr is held near the target boost voltage $VH_1$ and the suspended state of the boosting converter 20 is maintained.

Similar to the operation described by reference to FIGS. 8 to 10, in the operation of this example, the carrier frequency $F_{c1}$ of the first inverter 30 is $C_{10}$ and the carrier frequency $F_{c2}$ of the second inverter 40 is $C_{20}$ between the initial state of time zero and time $t_{11}$ when the boosting converter 20 is suspended. As described above by reference to FIGS. 8 to 10, the control unit 90 monitors the battery current IB, as illustrated in steps S401 and S402 of FIG. 11. When the battery current IB becomes equal to or less than the threshold value $I_0$, the boosting converter 20 is suspended, as illustrated in step S403 of FIG. 11. Next, the control unit 90 executes the carrier frequency changing program (carrier frequency changing means) 95, and determines the order of the inverters whose carrier frequencies are to be decreased when the real boost voltage VHr has become at least the second threshold voltage $VH_4$, as illustrated in steps S404 to S406 of FIG. 11 and indicated by line r of FIG. 13B.

A process to determine the order of the inverters whose carrier frequencies are to be decreased will be described by referring to FIG. 12. As illustrated in step S421 of FIG. 12, the control unit 90 obtains the number of revolutions of the first and second motor generators 50, 60 according to detection signals of the resolvers 51, 61 illustrated in FIG. 1. Next, the control unit 90 obtains torque command values of the first and second motor generators 50, 60 from the control data 96 of the control unit 90, as illustrated in step S422 of FIG. 12. The control unit 90 then calculates increasable amounts of the inverter losses of the first and second inverters 30, 40, respectively, as illustrated in step S423 of FIG. 12. An increasable amount $UP_{INV}$ of the inverter loss may be calculated, for example, by determining a difference between the carrier frequency at the time of suspension of the boosting converter 20 and the upper limit carrier frequency, and multiplying it by a torque command value T* and a coefficient. In the operation of this example, an increasable amount $UP_{INV1}$ of the inverter loss of the first inverter 30 is calculated from the carrier frequency $C_{10}$ of the first inverter 30 at the time of suspension of the boosting converter 20, the upper limit carrier frequency $C_{40}$, the torque command value Tg* of the first motor generator 50, and a coefficient $K_3$ by:

$$UP_{INV1} = (C_{40} - C_{10}) \times Tg^* \times K_3 \qquad \text{(Equation 3)}$$

The increasable amount $UP_{INV2}$ of the inverter loss of the second inverter 40 is calculated from the carrier frequency $C_{20}$ of the second inverter 40 when the boosting converter 20 is suspended, the upper limit carrier frequency $C_{40}$, the torque command value Tm* of the second motor generator 60, and a coefficient $K_4$ by:

$$UP_{INV2} = (C_{40} - C_{10}) \times Tg^* \times K_4 \qquad \text{(Equation 4)}$$

Figure 12:
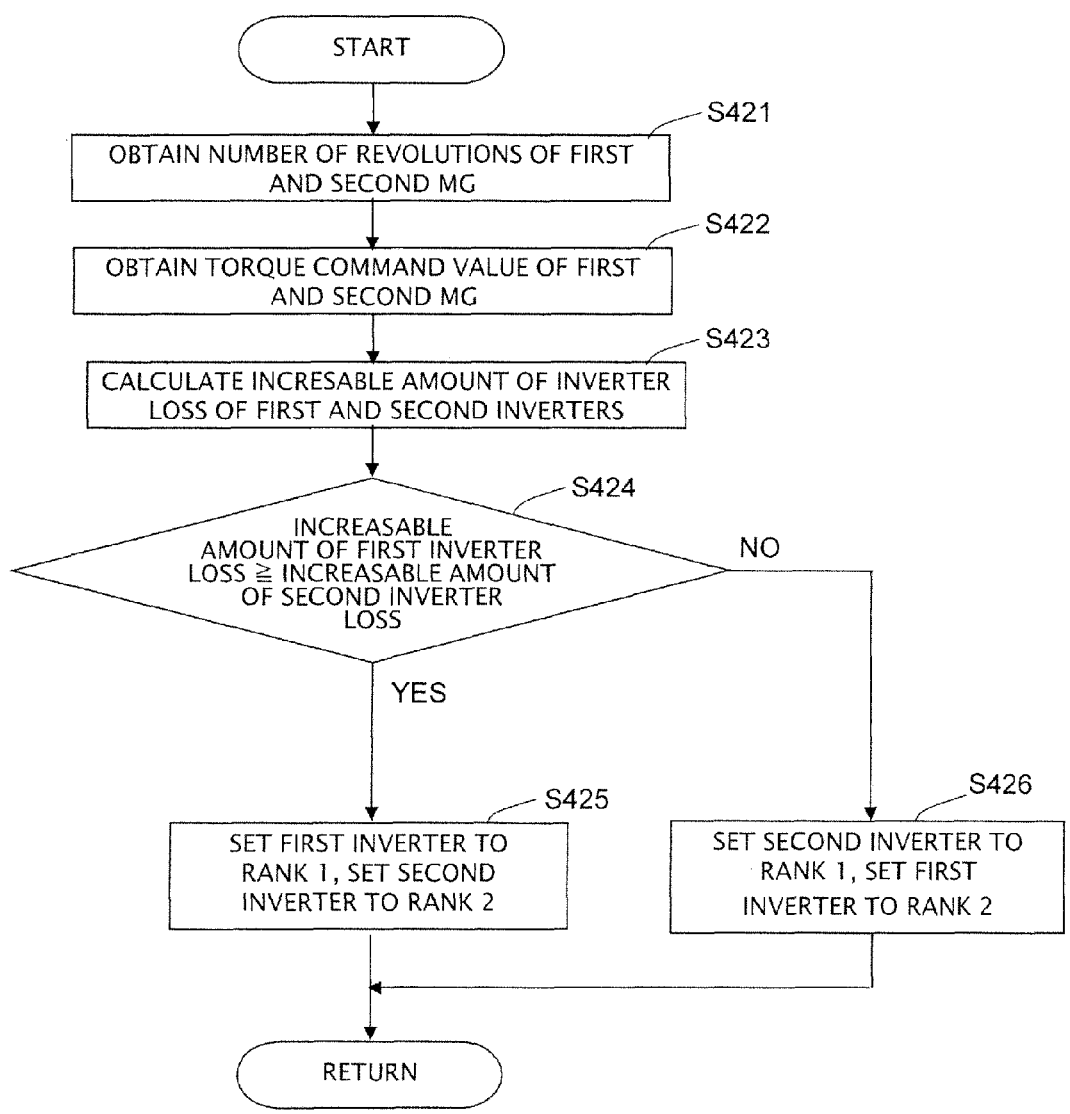
FIG. 12 is a flowchart illustrating another operation of the hybrid vehicle according to the embodiment of the present invention.

Next, the control unit 90 compares magnitude of the increasable amount $UP_{INV1}$ of the inverter loss of the first inverter 30 with the increasable amount $UP_{INV2}$ of the inverter loss of the first inverter 40, as illustrated by step S424 of FIG. 12. If it is determined that the increasable amount $UP_{INV1}$ of the inverter loss of the first inverter 30 is larger than the increasable amount $UP_{INV2}$ of the inverter loss of the second inverter 40, the control unit 90 sets the first inverter 30 to rank 1 and sets the second inverter 40 to rank 2, as illustrated in step S425 of FIG. 12. In contrast, if it is determined in step S424 of FIG. 12 that the increasable amount $UP_{INV2}$ of the inverter loss of the second inverter 40 is larger than the increasable amount $UP_{INV1}$ of the inverter loss of the first inverter 30, the control unit 90 sets the second inverter 40 to rank 1 and sets the first inverter 30 to rank 2, as illustrated in step S426 of FIG. 12.

Similar to the operation of the example described above by reference to FIGS. 8 to 10, the number of revolutions of the first motor generator 50 is larger than that of the second motor generator 60, the carrier frequency $C_{10}$ of the first inverter 30 is higher than the carrier frequency $C_{20}$ of the second inverter 40 ($C_{10} > C_{20}$), and the torque command value Tg* of the first motor generator 50 is larger than the torque command value Tm* of the second motor generator 60. Therefore, the increasable amount $UP_{INV1}$ of the inverter loss of the first inverter 30 is larger than the increasable amount $UP_{INV2}$ of the inverter loss of the second inverter 40. Accordingly, the control unit 90 sets the first inverter 30 to rank 1 and sets the second inverter 40 to rank 2, as illustrated in step S425 of FIG. 12.

Figure 11:
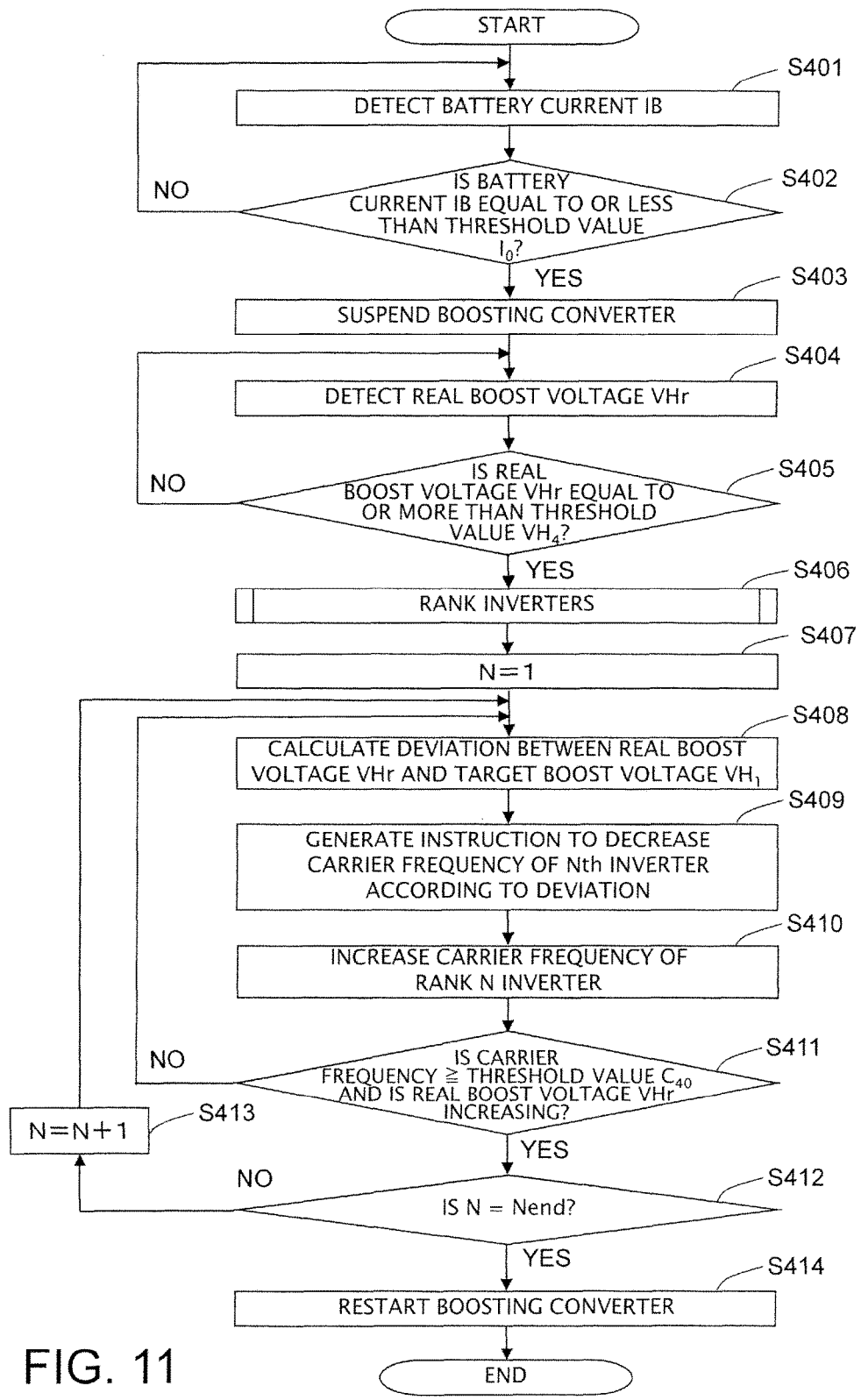
FIG. 11 is a flowchart illustrating another operation of the hybrid vehicle according to the embodiment of the present invention.
Figure 13A:
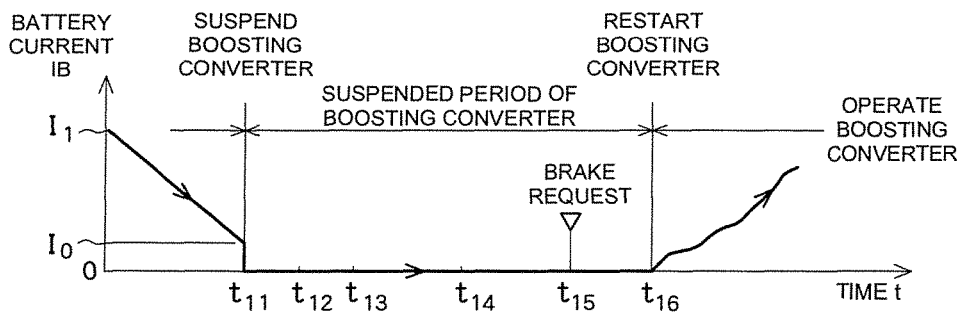
FIG. 13A is a graph illustrating a battery current over time during the operation illustrated in FIGS. 11 and 12.
Figure 13B:
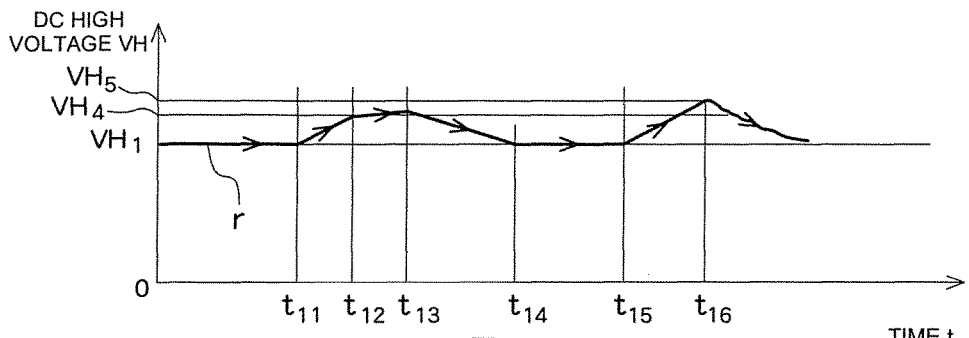
FIG. 13B is a graph illustrating a DC high voltage over time during the operation illustrated in FIGS. 11 and 12.
Figure 13C:
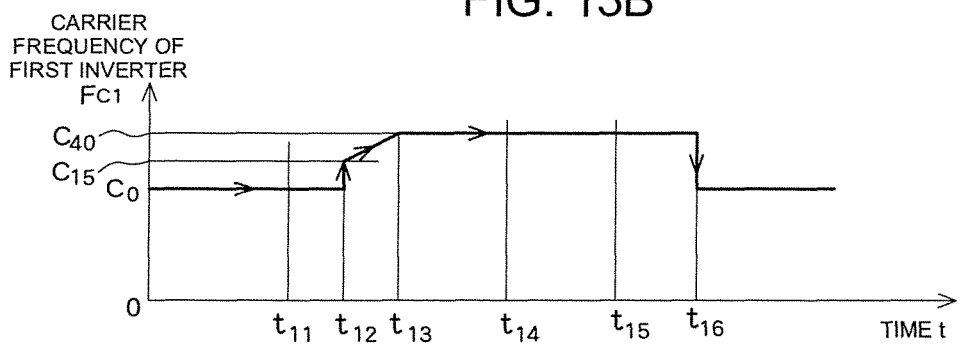
FIG. 13C is a graph illustrating a carrier frequency of a first inverter over time during the operation illustrated in FIGS. 11 and 12.
Figure 13D:
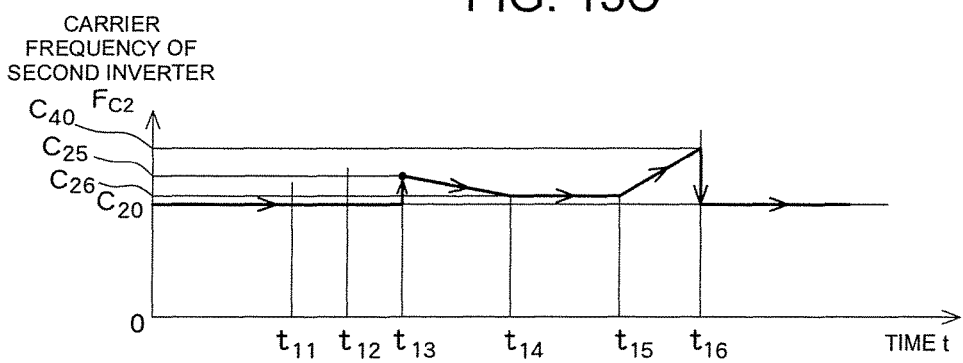
FIG. 13D is a graph illustrating a carrier frequency of a second inverter over time during the operation illustrated in FIGS. 11 and 12.

As illustrated in steps S408 to S410 of FIG. 11, the control unit 90 increases the carrier frequency $F_{c1}$ of the first inverter 30 from $C_{10}$ to $C_{15}$ at time $t_{12}$ of FIG. 13C, followed by increasing the carrier frequency $F_{c1}$ from $C_{15}$ to the upper limit carrier frequency $C_{40}$ from time $t_{12}$ to time $t_{13}$ of FIG. 13C, as illustrated in steps S408 to S412 of FIG. 11. As illustrated in FIG. 13C, while the carrier frequency $F_{c1}$ of the first inverter 30 is held at the upper limit carrier frequency $C_{40}$ at time $t_{13}$, the carrier frequency $F_{c2}$ of the second inverter 40 is increased from $C_{20}$ to $C_{25}$ as illustrated in FIG. 13D. The carrier frequency $F_{c2}$ of the second inverter 40 is then decreased from $C_{25}$ to $C_{26}$ between time $t_{13}$ and time $t_{14}$. At time $t_{14}$, the carrier frequency $F_{c2}$ of the second inverter 40 comes to $C_{26}$, as illustrated in FIG. 13D, where the power $Pm_1$ (positive) supplied to the second motor generator 60 becomes the power having the same power as and the opposite sign from the power ($Pg_0 \times \eta_1 \times \eta_2$) supplied to the second motor generator 60 of the power $Pg_0$ (negative) generated by the first motor generator 50. The real boost voltage VHr is held at the target boost voltage $VH_1$, as illustrated in FIG. 13B, to maintain the suspension state of the boosting converter 20.

At time $t_{15}$ of FIG. 13, the brake pedal is depressed and regenerative power is input from the second motor generator 60 to the second inverter 40. When the real boost voltage VHr starts to increase, the carrier frequency $F_{c2}$ of the second inverter 40 is increased from $C_{26}$. If the real boost voltage VHr continues to increase even when the carrier frequency $F_{c2}$ of the second inverter 40 has come to the upper limit carrier frequency $C_{40}$, the boosting converter 20 is restarted at time $t_{16}$ of FIGS. 13A to 13D to return to the normal operation, as illustrated in step S414 of FIG. 11. This operation provides a similar effect as that described above by reference to FIGS. 8 to 10.

Figure 14:
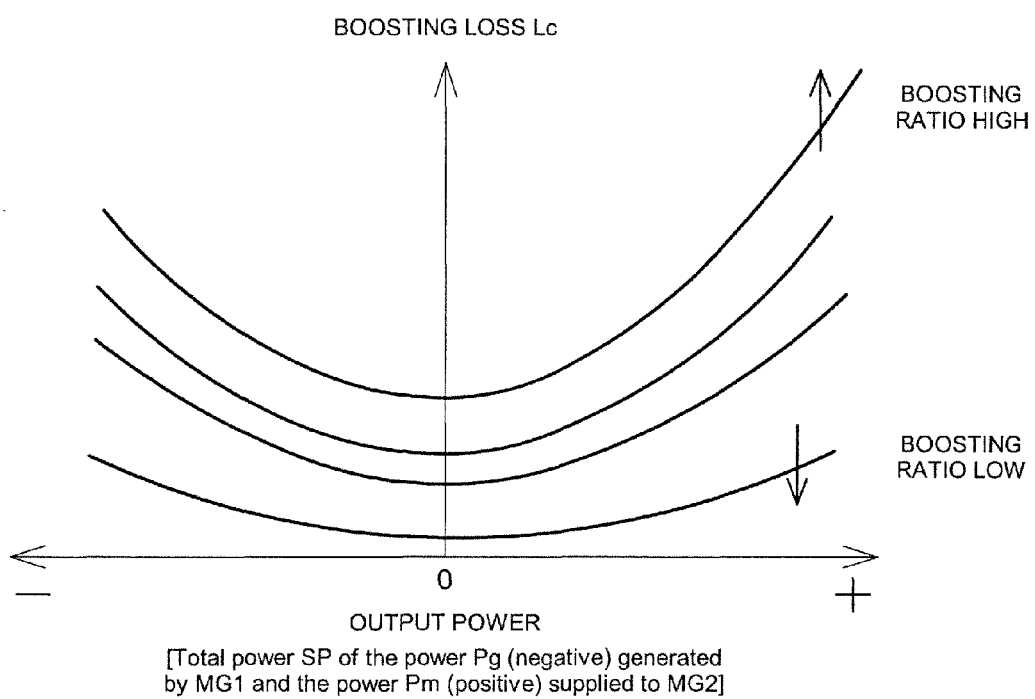
FIG. 14 is a graph illustrating a boosting loss characteristic of a boosting converter mounted on a hybrid vehicle according to the embodiment of the present invention.

In the operation described above by reference to FIGS. 6, 7, and 11 to 13, the carrier frequencies $F_{c1}$, $F_{c2}$ of the first and second inverters 30, 40 are increased in order to decrease the conversion efficiencies $\eta_1$, $\eta_2$ of the first and second inverters 30, 40, or to increase the inverter loss (switching loss). Accordingly, the power ($Pg_0 \times \eta_1 \times \eta_2$) supplied to the second motor generator 60 of the power $Pg_0$ generated by the first motor generator 50 is decreased. As a result, the real boost voltage VHr is held near the target boost voltage $VH_1$ and the suspended state of the boosting converter 20 is maintained. In this operation, however, if the increase amount of the inverter loss (switching loss) of the first and second inverters 30, 40 due to the increase of the carrier frequencies $F_{c1}$, $F_{c2}$ exceeds the decrease amount of the boosting loss caused by the suspension of the boosting converter 20, the improvement of the system efficiency of the hybrid vehicle (electric vehicle) 100 cannot be expected even when the boosting converter 20 is suspended. In such a case, the carrier frequency is not increased even when the boosting converter 20 is suspended. The boosting loss may be obtained, for example, according to a map of boosting loss as illustrated in FIG. 14. In FIG. 14, the horizontal axis represents a total power SP of the power Pg (negative) generated by the first motor generator 50 and the power Pm (positive) supplied to the second motor generator 60. When the power Pg (negative) generated by the first motor generator 50 is approximately equal to the power Pm (positive) supplied to the second motor generator 60, SP comes close to zero. By avoiding undue increase of the carrier frequencies, an unnecessary increase of the loss can be restricted and the system efficiency of the hybrid vehicle (electric vehicle) 100 can be improved effectively.

The present invention is not limited to the embodiments described above. Rather, the present invention encompasses any alternations and modifications without departing from the invention described technically or essentially as defined by the appended claims. For example, the boosting converter 20 of the embodiments above is suspended when the battery current IB detected by the battery current sensor 83 has become equal to or less than the threshold value $I_0$. Alternatively, the boosting converter 20 may be suspended when the reactor current IL, instead of the battery current IB, detected by the reactor current sensor 84 becomes equal to or less than the threshold value $I_0$, because the power (battery voltage VB×battery current IB) output from the battery 10 is equal to the power (DC low voltage VL×reactor current IL) passing through the reactor 12, and the battery voltage VB is equal to the DC low voltage VL applied across the filter capacitor 11.

What is claimed is:

1. An electric vehicle, comprising:
   a battery;
   a boosting converter connected to the battery;
   a first inverter connected to the boosting converter;
   a second inverter connected to the boosting converter and the first inverter;
   a first motor generator connected to the first inverter;
   a second motor generator connected to the second inverter; and
   a control unit configured to start and suspend the boosting converter,
   wherein during a suspended state of the boosting converter, the control unit increases a carrier frequency of one of the first and second inverters having a larger increasable amount of the inverter loss, which is generated by the increase of the carrier frequency, as a real boost voltage increases, and decreases a carrier frequency of one of the first and second inverters having a larger decreasable amount of the inverter loss, which is generated by the decrease of the carrier frequency as the real boost voltage decreases, wherein the real boost voltage is an output voltage of the boosting converter.

2. The electric vehicle according to claim 1, wherein the carrier frequency of the inverter that is connected to the one of the first and second motor generators having a higher number of revolutions is decreased when a difference between the decreasable amounts of the inverter loss, which are generated by the decrease of the carrier frequency, of the first and second carrier frequencies is smaller than a predetermined threshold value.

3. The electric vehicle according to claim 1, wherein during the increase of the carrier frequency, when an increase amount of the inverter loss, which is generated by the increase of the carrier frequency, exceeds a decrease amount of a boosting loss generated by suspension of the boosting converter, the carrier frequency is not increased.

4. The electric vehicle according to claim 2, wherein during the increase of the carrier frequency, when an increase amount of the inverter loss, which is generated by the increase of the carrier frequency, exceeds a decrease amount of a boosting loss generated by suspension of the boosting converter, the carrier frequency is not increased.

5. A method for controlling an electric vehicle, the electric vehicle including:
   a battery;
   a boosting converter connected to the battery;
   a first inverter connected to the boosting converter;
   a second inverter connected to the boosting converter and the first inverter;
   a first motor generator connected to the first inverter; and
   a second motor generator connected to the second inverter,
   wherein during a suspended state of the boosting converter, a carrier frequency of one of the first and second inverters having a larger increasable amount of the inverter loss, which is generated by the increase of the carrier frequency is increased when a real boost voltage increases, and a carrier frequency of one of the first and second inverters having a larger decreasable amount of the inverter loss, which is generated by the decrease of the carrier frequency is decreased when the real boost voltage decreases, wherein the real boost voltage is an output voltage of the boosting converter.

* * * * *